(12) United States Patent
Sigeti et al.

(10) Patent No.: US 6,208,997 B1
(45) Date of Patent: Mar. 27, 2001

(54) RAPID PRODUCTION OF OPTIMAL-QUALITY REDUCED-RESOLUTION REPRESENTATIONS OF VERY LARGE DATABASES

(75) Inventors: David E. Sigeti, Los Alamos, NM (US); Mark Duchaineau, Livermore; Mark C. Miller, Davis, both of CA (US); Murray Wolinsky; Charles Aldrich, both of Santa Fe, NM (US); Mark B. Mineev-Weinstein, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/173,213

(22) Filed: Oct. 15, 1998

Related U.S. Application Data

(60) Provisional application No. 60/063,744, filed on Oct. 17, 1997.

(51) Int. Cl.[7] .................................................. G06F 17/30
(52) U.S. Cl. ........................... 707/104; 707/6; 707/10; 707/102; 704/226; 704/227; 382/124
(58) Field of Search .................................... 345/419, 421, 345/422, 427, 430, 355; 382/124, 260, 125; 704/226, 227, 233, 211, 222; 707/5, 6, 10, 2, 3, 102, 104, 522

(56) References Cited

U.S. PATENT DOCUMENTS

| | | | | |
|---|---|---|---|---|
| 4,694,404 | * | 9/1987 | Meagher | 345/421 |
| 5,163,126 | * | 11/1992 | Einkauf et al. | 345/423 |
| 5,189,626 | * | 2/1993 | Colburn | 700/182 |

(List continued on next page.)

OTHER PUBLICATIONS

Aldelguerfi, Mahdi et al., "A Terrain Database Representation based on an Extended Vector Product Format (EVPF)," Proceedings of the fifth International Conference on Information and Knowledge Management, Nov. 12–16, pp. 27–33.*

(List continued on next page.)

*Primary Examiner*—Hosain T. Alam
*Assistant Examiner*—Shahid Alam
(74) *Attorney, Agent, or Firm*—Ray G. Wilson

(57) ABSTRACT

View space representation data is produced in real time from a world space database representing terrain features. The world space database is first preprocessed. A database is formed having one element for each spatial region corresponding to a finest selected level of detail. A multiresolution database is then formed by merging elements and a strict error metric is computed for each element at each level of detail that is independent of parameters defining the view space. The multiresolution database and associated strict error metrics are then processed in real time for real time frame representations. View parameters for a view volume comprising a view location and field of view are selected. The error metric with the view parameters is converted to a view-dependent error metric. Elements with the coarsest resolution are chosen for an initial representation. Data set first elements from the initial representation data set are selected that are at least partially within the view volume. The first elements are placed in a split queue ordered by the value of the view-dependent error metric. If the number of first elements in the queue meets or exceeds a predetermined number of elements or whether the largest error metric is less than or equal to a selected upper error metric bound, the element at the head of the queue is force split and the resulting elements are inserted into the queue. Force splitting is continued until the determination is positive to form a first multiresolution set of elements. The first multiresolution set of elements is then outputted as reduced resolution view space data representing the terrain features.

14 Claims, 19 Drawing Sheets

U.S. PATENT DOCUMENTS

| | | | | |
|---|---|---|---|---|
| 5,535,300 | * | 7/1996 | Hall et al. | 704/227 |
| 5,905,499 | * | 5/1999 | McDowall et al. | 345/419 |
| 5,926,555 | * | 7/1999 | Ort et al. | 382/124 |
| 5,983,220 | * | 11/1999 | Schmitt | 707/5 |
| 6,038,561 | * | 3/2000 | Snyder et al. | 707/6 |

OTHER PUBLICATIONS

Albanesi, Maria et al., "A Compact Wavelet Index for Retrieval in Image Database," Proceedings of the 1999 International Conference on Image Analysis and Processing, Sep. 27–29, 1999, pp. 927–932.*

Guedes, Luiz C. C., "Real–time terrain surface extraction at variable resolution," Proceedings of the 1997 X Brazilian Symposium on Computer Graphics and Image Processings, Oct. 14–17, 1997, pp. 87–94, 230.*

Hill, R. et al., "Accuracy of local mean signal prediction in urban environments input database granuarity issues," 48th IEEE Vehicular Technology Conference, May 18–21, 1998, VTC 98., pp. 1140–1144, vol. 2.*

Kung, S.Y. et al., "Decision–based neural network for face recognition system," Proceedings of the 1995 International Conference on Image Processing, Oct. 23–26, 1995. pp. 430–433 vol. 1.*

Pajarola, R., "Large Scale Terrain Visualization using the restricted quadtree triangulation," Proceedings of 1998 Visualization, Oct. 18–23, 1998, pp. 19–26, 515.*

Schiavone, Guy et al., "Terrain Database Interoperability Issues in Training with Distributed Interactive Simulation," ACM Transactions on Modeling and Computer Simulation, vol. 7, No. 3, Jul. 1997, pp. 332–367, Nov. 1996.*

* cited by examiner

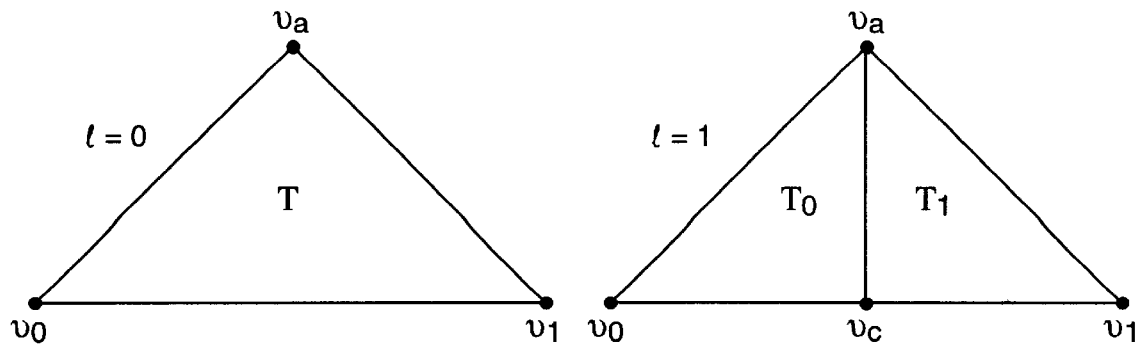
Fig 2A  Fig 2B
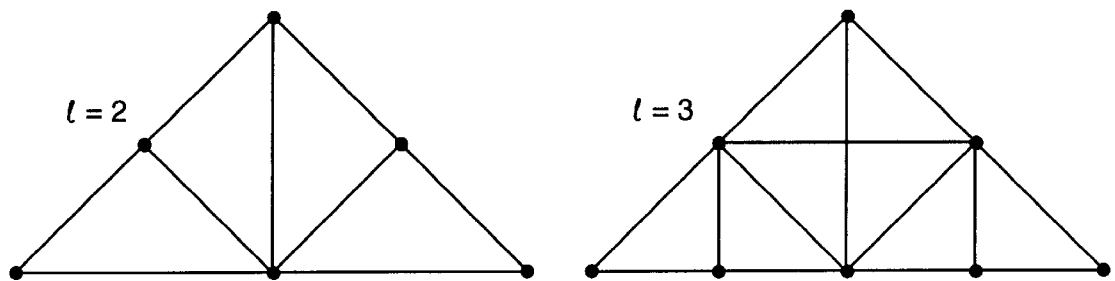
Fig 2C  Fig 2D
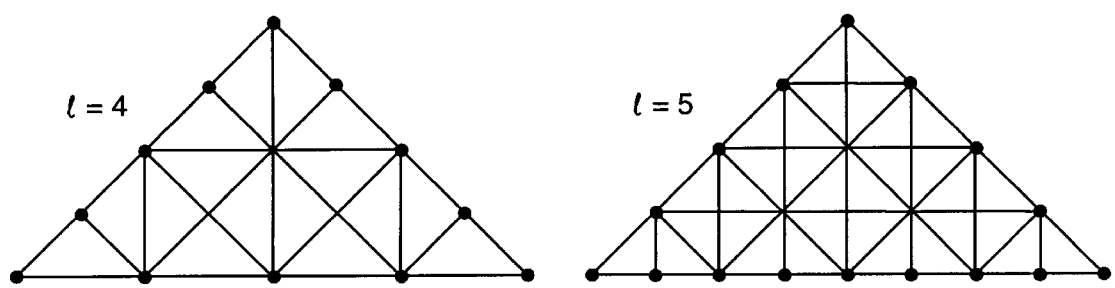
Fig 2E  Fig 2F

RAPID PRODUCTION OF OPTIMAL-QUALITY REDUCED-RESOLUTION REPRESENTATIONS OF VERY LARGE DATABASES

RELATED APPLICATIONS

This application claims the benefit of U.S. Provisional Application Ser. No. 60/063,744, filed Oct. 17, 1997.

STATEMENT REGARDING FEDERAL RIGHTS

This invention was made with government support under Contract No. W-7405-ENG-36 awarded by the U.S. Department of Energy. The government has certain rights in the invention.

REFERENCE TO A MICROFICHE APPENDIX

A microfiche appendix is filed herewith having 4 sheets with 387 frames. The program listing set out in the microfiche contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to multiresolution representations of very large spatial databases, and, more particularly, to reduced resolution approximations of very large databases, where the approximations are computable at rates that facilitate real-time (e.g., interactive) viewing and controllable to meet specific constraints on the error in the approximations or the time required to render a view of them.

BACKGROUND OF THE INVENTION

Many databases have already or will soon have grown to the point where the production of useful views of the entire database at real-time (interactive) rates is impossible. In many cases (for example, high resolution spatial databases), it would be acceptable to work with a reduced-resolution representation that approximates the original database and that is small enough to be manipulated and viewed in real time. The representation should do the best job of approximating the original database at some given size for the representation. In other words, the representation should be optimal. Furthermore, the representation, in general, will need to be tailored to the particular views that are to be generated. This implies that the representation itself must be produced in real time. Finally, since the size of databases will only continue to grow, the methods for producing reduced-resolution representations should not impose any inherent limits on the size of the databases that can be approximated.

The invention described here, dubbed ROAM for Real-time Optimally Adapting Meshes, is a general method for producing optimal-quality, reduced-resolution approximate representations of arbitrarily large databases in real time. For example, in an exemplary embodiment discussed below for terrain rendering, the ROAM method is used to produce a reduced-resolution representation of a large terrain database that is optimized for viewing from a given location with a given direction and field of view. The representation can be produced at a rate of 30 frames per second (or faster) making the process appropriate for interactive fly-over of the terrain. In comparison with other methods of approximating a terrain for interactive viewing, ROAM produces approximate representations of much higher quality resulting in a dramatic reduction in visual artifacts as compared with other methods of approximating a terrain for interactive viewing.

In addition to requiring a reduced-resolution representation to be optimal, there will often be cases in which certain features need to be represented exactly, that is, as they would be if no reduction in resolution had taken place. ROAM includes a very general mechanism for guaranteeing that distinguished features of the database are exact in the representations that it produces. In many cases, this can be done with negligible effect on the quality of other features (which are still being approximated) or the speed with which the representation is produced. For example, in the exemplary embodiment for terrain rendering, ROAM can guarantee that lines of sight from the eye to distinguished targets are exact (that is, clear or occluded as they would be if the exact terrain were used) in the terrain representation that it produces for interactive viewing. ROAM can make this guarantee for dozens to hundreds of distinguished lines of sight with negligible effect on either performance or the overall quality of the approximated terrain. The ability to guarantee exact lines of sight in scenes generated in real time is obviously important in, for example, simulations for training of military pilots.

ROAM's ability to produce approximate representation in which essentially arbitrary features are exactly represented is a major advance in solving the difficult problem of maintaining consistency between real-time simulations, which must be able to interact while remaining free to choose their own approximations for terrain and other databases in order to fit their individual computational capabilities, and needs for accuracy. In such situations, ROAM maintains consistency by allowing each simulation system to construct its own representation subject to the condition that the features that must be consistent are represented exactly.

Terrain remains one of the most challenging types of large spatial databases for visualization because it is not naturally decomposed into parts whose complexity can be adjusted independently, and because the qualities required of a triangulation are view dependent. Classic geometry level-of-detail (LOD) optimization algorithms are not immediately applicable to terrain because they require independently adjustable parts. Traditional triangulation optimizations do not apply directly to terrain visualization because they do not admit flexible view-dependent error objectives, and they are much too slow to be used for each frame.

Known existing algorithms that can interactively perform view-dependent, locally-adaptive terrain meshing, including the process of the present invention, rely on a pre-defined multiresolution terrain representation that is used to build the adaptive triangle mesh for a frame. Typically, neighborhoods that are flat or distant are triangulated more coarsely than close or rough neighborhoods that require finer details. See, e.g., Mark C. Miller, "Multiscale Compression of Digital Terrain Data to Meet Real time Rendering rate Constraints," University of California-Davis, graduate thesis (1995), incorporated herein by reference.

On current graphics hardware and software, the problem remains to maintain dynamic, view-dependent triangle meshes and texture maps that produce good images at the required frame rate. Using ROAM, meshes are constructed that optimize flexible view-dependent error metrics, produce guaranteed error bounds, achieve specified triangle counts directly, and use frame-to-frame coherence to operate at high frame rates for thousands of triangles per frame.

Various objects, advantages and novel features of ROAM will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the process of this invention comprises a computer-implemented process for producing view space representation data in real time from a world space database representing terrain features. The world space database is first preprocessed. A database is formed having one element for each spatial region corresponding to a finest selected level of detail. A multiresolution database is then formed by merging elements at the finest level of detail and subsequent intermediate levels of detail to define a hierarchy of element resolutions until a coarsest selected resolution is obtained. A strict error metric is computed for each element at each level of detail that is independent of parameters defining the view space and that is approximately monotonic to associate with the elements forming the multiresolution database. The multiresolution database and associated error metrics are then stored.

The multiresolution database and associated strict error metrics are then processed in real time for real time frame representations. View parameters for a view volume comprising a view location and field of view are selected. The error metric with the view parameters is converted to a view-dependent error metric. Elements with the coarsest resolution are chosen for an initial representation. Data set first elements from the initial representation data set are selected that are at least partially within the view volume. The first elements are placed in a split queue ordered by the value of the view-dependent error metric where the first element having the largest error metric is placed at the head of the queue. A determination is made whether the number of first elements in the queue meets or exceeds a predetermined number of elements or whether the largest error metric is less than or equal to a selected upper error metric bound. Tthe element at the head of the queue is force split, including: removing the element from the split queue and the representation; splitting the element into its children; testing the children against view volume if the parent was not all in the view volume; adding the children to the tree as children of the element from which it was split, constituting a new leaf element; and inserting the children into the split queue if the above determination is negative. The children in the queue are redesignated as first elements and the determination and force splitting are repeated until the determination is positive to form a set of second elements in the split queue as the representation data set. The set of second elements is then outputted as reduced resolution view space data representing the terrain features.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 2A–2F depict the binary triangle tree with a hierarchy of approximations generated by recursive subdivisions.

DETAILED DESCRIPTION

Figure 1:
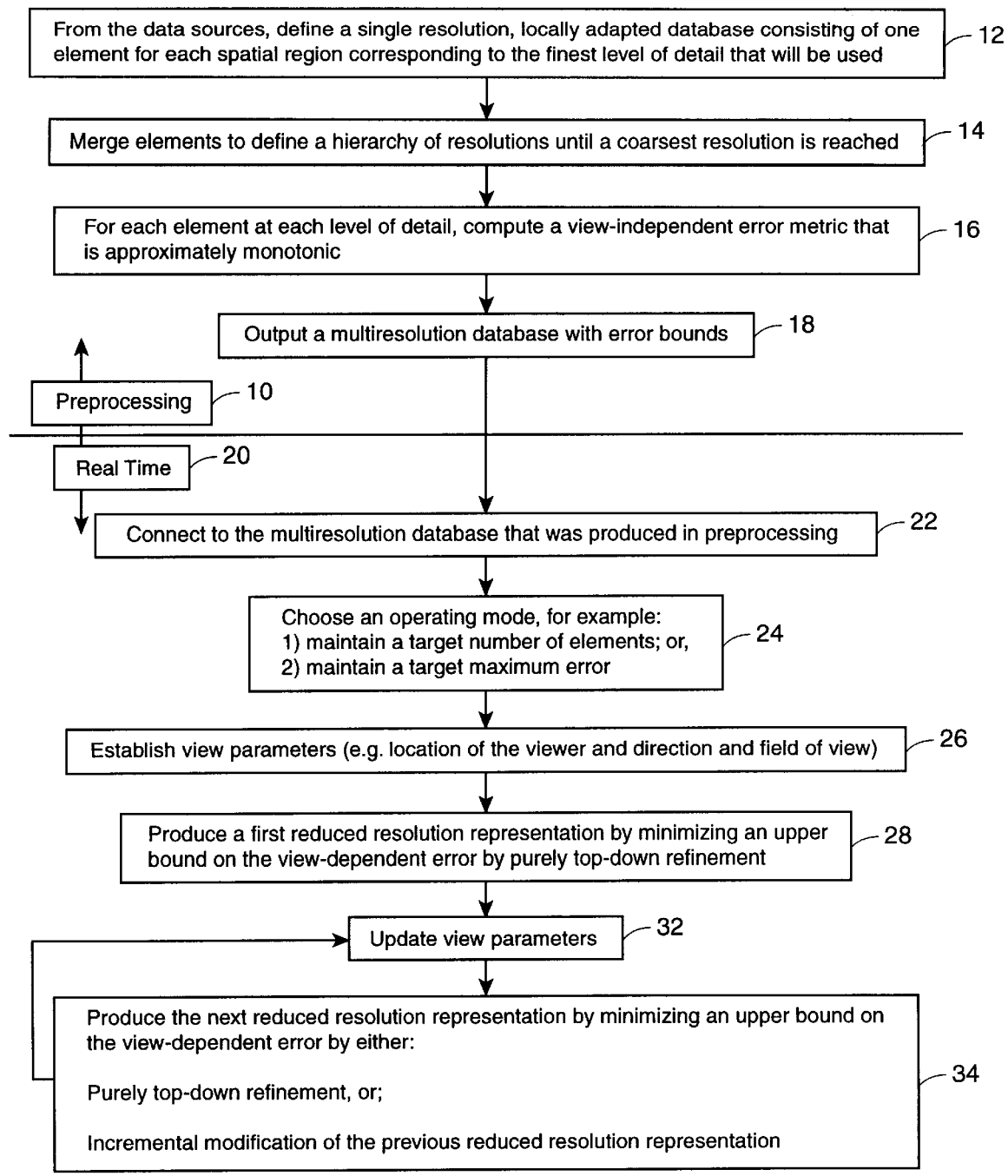
FIG. 1 is a flow diagram with an overall view of an exemplary process of the present invention.

The present invention is directed to the real-time representation of a high resolution spatial database when viewed from along different directions of view and from different locations about the database using Real-Time Optimally Adapting Meshes (ROAM). A well-known exemplary spatial database is a large area topographical map, which will be used to illustrate the present invention. This application of ROAM is described in M. Duchaineau et al., "ROAMing Terrain: real-time Optimally Adapting Meshes," Proceedings Visualization '97, conference held Oct. 19–24, 1997, incorporated herein by reference.

A topographical map contains both two-dimensional coordinate information and elevation information. The amount of data in the finest resolution of such a topographical map cannot be handled on a real-time basis. But the amount of data can be reduced by using triangulation to approximate defined areas of the database. A planar representation approximating the elevation within a triangular element can be defined by specifying the coordinates and elevations at the vertices of the triangle.

In addition, a strict error bound can be associated with the triangle that specifies the maximum distance between the true elevation and the planar representation within the triangle. It will be appreciated that these error bounds will become smaller as a triangle is split into its children and it is a particular feature of the present invention, as explained below, to use such error bounds in producing an optimal approximate representation of the high resolution database. Thus, a hierarchy of triangles can be constructed with a few, large triangles at the top of the hierarchy forming the coarsest representation of the database. Smaller triangles are formed by successive splitting of large triangles, permitting finer representations of the database. A strict error bound on the elevation within each triangle makes it possible to measure the fidelity with which a representation approximates the original database.

In "flying" over the terrain represented by the topographicallogical map, the topographicallogical features must be converted from a two dimensional map presentation to a three-dimensional "view" presentation. This three-dimensional presentation must then be converted to a two-dimensional "screen" presentation by a process of perspective projection. Because of this perspective transformation, a large error in the representation of a distant part of the terrain can project to a small error on the screen. Conversely, a small error in the representation of a nearby part can project to a large error on the screen. Thus, the error that should be minimized is the projected error, which depends on the view.

Accordingly, the screen space error bound associated with a given triangle within the hierarchy changes as the view location changes. But the absolute value of these strict error bounds in world space does not change. In accordance with the present invention, the world space strict error bounds are precomputed and only a rapid transformation is needed to compute view-dependent screen error bounds.

The view presentation will change continuously as the location of the viewer changes, but more distant features of the representation will change more slowly than closer features. The present invention uses incremental computation to take advantage of this geometric fact to reduce the number of feature updates that must be done after each time step and, thus, to increase the frame rate for updated views.

A feature of database representation using ROAM is that only a given number of triangles are formed from a given database size for the approximation. In order to form a useful representation, the triangle sizes must be allocated over the database to minimize the resulting error bounds. That is, large triangles are provided where the terrain is smooth or distant from the viewer and smaller triangles are formed where the terrain is rough or closer to the viewer. In addition, higher resolution is required at particular points along a desired line-of-sight (LOS) in order to assure that selected targets are obscured or hidden from view along a LOS as they would be if the terrain were represented at the finest level of detail. ROAM does this by refining the terrain only at that small set of points where it must be refined in order to get the line-of-sight exact.

DEFINITIONS

The following definitions are applied to the terms used herein to describe the invention:

Multi-Resolution Hierarchy—A multi-resolution hierarchy, M, associated with a spatial domain, D, of any integral dimension, n, is a collection of rooted trees (in the computer science sense) with the following properties:

1. Each node ("element" herein) of M is associated with a subset of the domain D. (Loosely speaking, each node covers a region of D.)
2. The set of subsets of D that are associated with the children of a node, N, is a disjoint partition of the subset of D that is associated with N. In other words, the children are disjoint and collectively cover the same region as the parent. (The subsets of D do not have to be strictly disjoint. In particular, subsets of a given dimensionality can be allowed to overlap on subsets of a lower dimensionality. So, for example, polygons may be allowed to overlap on edges and vertices and edges may be allowed to overlap on vertices.)
3. The set of subsets of D that are associated with the root nodes of the trees constituting M is a disjoint partition of D. (In other words, the individual trees are disjoint and collectively cover D.)
4. The data associated with a node constitute an approximation of the data associated with its children. (This approximation may be as simple as a subsampling of the children's data.)

An immediate consequence of the above is that the set of all leaf nodes of all the trees constituting M is a disjoint partition of D. Thus, the set of all leaf nodes forms the finest resolution in the multiresolution hierarchy, M.

Conversely, "tree" is the multiresolution hierarchy constructed at run time in order to produce a reduced resolution of a database. it is actually a collection of subtrees, one for each element in the coarsest resolution representation of the database. As used below, the elements constituting the representation are a subset of the leaves of the tree (those that intersect the view volume).

Each element at the coarsest representation of the database is the root of a subtree. Children of an element of a subtree are elements formed by splitting the root element. Leafs of the tree are elements that have no children, i.e., the finest level of detail being used at the time.

The children of a node are said to be a "refinement" of their parent and the parent is said to be a "coarsening" of its children. These usages are extended to any set of descendents of a node that collectively cover the same region as the ancestor node. A node is said to "exist at" (or "constitute") a "coarser" level of detail than its descendents and the descendents are said to exist at (or constitute) a "finer" level of detail.

Since the nodes in the multi-resolution hierarchy will be used as elements of a variable-resolution representation of the underlying database, the terms "node" and "element" are used interchangeably.

A "strict error metric" on M exists if each non-leaf node, N, contains information (the error metric) that bounds the error made in using the data contained in N versus using the data contained in any possible refinement of N. An error metric is "monotonic" if the error metric associated with any descendent of a node, N, is always less than or equal to the error metric associated with N. In other words, having a monotonic error metric guarantees that refining a region will not result in an increased error metric. An error metric is "approximately monotonic" if refining a region "usually" reduces the error metric. The definition of "usually" will depend on context.

Multi-Resolution Database—A multi-resolution database is a database in which the data are organized in a multi-resolution hierarchy. A database "supports a multi-resolution hierarchy" if it can be usefully converted to a multi-resolution database.

camera coordinates: a coordinate system in which the location of view is the origin and the z-axis lies along the direction of view. No perspective transformation is done. In other words, the transformation from world space to view space is just a translation to get the origin at the location of view and a rotation to place the z-axis along the direction of view.

element: a representation of a spatial region at a selected level of detail.

exact features: representation features as if no reduction in resolution had taken place.

field-of-view: the annular width of the view volume, both horizontally and vertically as seen from the location of view.

incremental computation: data structure is computed using the data structure from a previous representation as the starting point.

line-of-sight: line from a view location to a distinguished target.

representation: a set of elements, one for each spatial region, constituting a view-dependent representation of the database. The representation may consist of a number of disparate data structures, each containing information about the elements that define the representation. In the current embodiment, the representation consists of a subset of the leaves of the tree (those that intersect the view volume). A separate list of triangle strips are used to present the representation to the rendering system.

Forced split: A process for splitting a selected element that may require neighboring elements to be split before the selected element is split. This may be required in order, for example, to preserve continuity in the representation of data. Because a neighbor to be split may, in turn, require that some of its neighbors be split before it is split, a function implementing a forced split must be recursive. The final step in a forced split is a simple split of the original selected element.

Simple split: A process for splitting a selected element that does not require any neighbors to be split first. A simple split is the last step in a forced split. The simple split process may require that some neighbors of the selected element be split simultaneously with the selected element in order, for example, to preserve continuity in the representation of data.

view: a projection of a spatial database determined by a location of view, a direction of view, a field-of-view, and a perspective transformation; more generally, any projection or transformation of a spatial database.

view volume: the volume of space defined by six bounding planes: a near clipping plane, a far clipping plane, and four side planes, all with perspective transformation; more generally, the volume of a spatial database included in a given view.

wedgie: an element with error bounds, i.e., a volume defined by vertex location coordinates and vertex heights with error bounds.

world space: a view-independent coordinate system used to describe a spatial database.

MESH STRUCTURE

The leaf elements of a multiresolution hierarchy constitute a mesh over the spatial domain that they represent. Any mesh that arises as the leaf elements of a multiresolution hierarchy may be used with the basic optimization processes described here. An example of such a mesh that is used in the terrain embodiment is described below. Another example that could be used with two-dimensional data is a standard quadtree mesh. Similarly, a standard octree mesh could be used with three-dimensional data. (See Samet, *The Design and Analysis of Spatial Data Structures* (Addison-Wesley, 1990); Samet, *Applications of Spatial Data Structures* (Addison-Wesley, 1990) for descriptions of quadtree and octree meshes.) Another mesh that could be used with three-dimensional data is the recursive, tetrahedral mesh described by Zhou, et al., "Multiresolution Tetrahedral Framework for Visualizing Regular Volume Data," Proceedings Visualization '97, pp. 135–142 (Conference held Oct. 19–24, 1997).

An important question when producing reduced-resolution representations of spatial databases is whether or not it is necessary or desirable to preserve continuity in functional data defined on the spatial domain. For example, it is obviously desirable and, for many purposes, necessary to preserve continuity in the representation of terrain elevation in producing reduced-resolution representations of a topographicalgraphic database for real-time scene generation. If continuity is not preserved, then the terrain representation will show either many holes in the terrain or many regions where the terrain is vertical solely as an artifact of the approximation process.

For certain kinds of meshes, continuity in function representations can be achieved by requiring certain neighbors of a selected element to be split either before or simultaneously with the splitting of the selected element. This may be implemented with "forced splits" containing "simple splits" as defined above. This method may be used with, for example, the triangular mesh used in the ROAM terrain embodiment or the recursive, tetrahedral mesh mentioned above. The use of this method in the terrain embodiment for preserving continuity in the terrain elevation is described below.

Note that a forced split reduces to a simple split if the set of neighbors that must be split before the selected element is empty. Similarly, a simple split reduces to a split of the selected element alone if the set of neighbors that must be split simultaneously with the selected element is empty. Thus, the forced-split/simple-split process includes the split of a single element that is done if there is no need to preserve continuity.

An example of a situation in which it is not necessary to preserve continuity in a function representation is the production of a reduced resolution representation of a topographicalgraphic map solely for the purpose of determining if selected lines of sight are clear or occluded by the terrain at the finest level of detail. In this case, there is no need to preserve continuity in the representation of the elevation function and the set of neighbors that must be split before a selected element is split (in the forced split process) and the set of neighbors that must be split simultaneously with the selected element (in the simple split process) may be taken to be empty, reducing the forced split/simple split process to a split of the selected element alone.

Another example in which continuity in a function representation need not be preserved is the production of reduced resolution representations of a three-dimensional database of atmospheric opacity for the purpose of rapid computation of approximations to the absorption along selected paths. Appropriate meshes for this problem would be either an octree mesh or the recursive, tetrahedral mesh mentioned above. Since imposing continuity on the representation of the opacity function does not improve the computation of path absorption, we may reduce forced splits to simple splits and simple splits to splits of the selected element alone as described above.

The ROAM terrain embodiment works with triangle-based meshes for application to a terrain database. Collectively these triangles form a binary tree. For ease of exposition, a "world-space," model, e.g., a flat-Earth reference model, is used. A reference plane at z=0 is taken: the desired terrain is specified by height samples $Z_{ij}$ for a uniformly-spaced grid of post positions $(x_i,y_i)$ within a finite domain in the base plane.

Triangles in ROAM are obtained by recursive subdivision of the domain. A right isosceles triangle in the base plane contains the domain, the root triangle. Bisecting the right angle of the root triangle yields two smaller right isosceles triangles. Recursively dividing the triangles so obtained yields a collection of right isosceles triangles, forming a binary tree with $2^l$ triangles at level l, each at a scale factor of $2^{-\frac{l}{2}}$ relative to the root, as shown in FIGS. 2A–2F, i.e., a hierarchy of resolutions for the domain.

TRIANGLE MESHES

FIGS. 2A–2F show the first few hierarchal levels of a triangle bintree. The root triangle, $T=(v_a,v_b,v_c)$, is defined to be a right-isosceles triangle at the coarsest level of subdivision, l=0 (FIG. 2A). At the next-finest level, l=1 (FIG. 2B), the children of the root are defined by splitting the root along an edge formed from its apex vertex va to the midpoint vc of its base edge $(v_0,v_1)$. The left child of T is $T_0=(v_c,v_a,v_0)$ while the right child of T is $T_1=(v_c,v_1,v_a)$. The rest of the triangle bintree is defined by recursively repeating this splitting process, as shown in FIGS. 2B–2F.

Figure 3A:
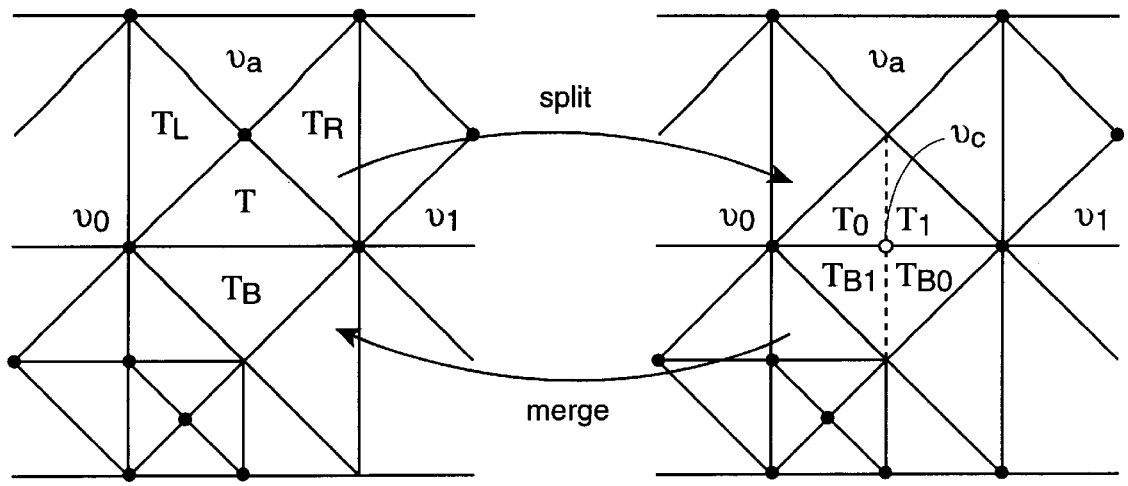
FIGS. 3A and 3B depict a simple split and merge and a cascade of forced splits, respectively.

Meshes in the world space are formed by assigning world-space positions w(v) to each bintree vertex. A set of bintree triangles forms a continuous mesh when any two triangles either overlap nowhere, at a common vertex, or at a common edge. Such continuous meshes are called bintree triangulations or simply triangulations. FIG. 3A shows a typical neighborhood about a triangle T within a triangulation. $T_B$ is the base neighbor sharing base edge $(v_0,v_1)$; $T_L$ is the left neighbor sharing left edge $(v_a,v_0)$, and $T_R$ is the right neighbor sharing right edge $(v_1,v_a)$.

A key fact about bintree triangulations is that neighbors are either from the same bintree level l as T, or from the next finer level l+1 for left and right neighbors, or from the next coarser level l−1 for base neighbors. All of these possible relationships are depicted amongst the triangles shown in FIG. 3A.

When T and $T_B$ are both from the same level l, the pair $(T,T_B)$ is called a diamond. A simple split operation and its inverse, merge, are depicted in FIG. 3A for a triangulation containing a diamond. Split replaces triangle T with its children $(T_0,T_1)$, and triangle $T_B$ with its children $(T_{B0},T_{B1})$. This split operation introduces one new vertex $v_c$ at the diamond center, resulting in a new, continuous triangulation. If triangle T does not have a base neighbor $T_B$, only T is split into its children. Merging can be applied to diamond $(T,T_B)$ when the children of T and $T_B$ (if $T_B$ exists) are all in the triangulation. In this case, $(T, T_B)$ is said to be a mergeable diamond for the triangulation.

An important fact about the split and merge operations is that any triangulation may be obtained from any other triangulation by a sequence of splits and merges.

Splits and merges can be animated using vertex morphing to provide a simple form of temporal continuity. For a time interval t ∈[0,1], consider the split of diamond $(T,T_B)$ shown in FIG. 3A. Instead of moving $v_c$ immediately to its new position $w_c=w(v_c)$, let it move linearly over time from the unsplit base-edge midpoint $w_m=(w(v_0)+w(v_1))/2$ as $w_a(t)=(1-t)w_m+tw_c$. Merges can be animated in a similar way. Morphing is useful to reduce the visual impact of "popping" (sudden changes in the terrain appearance).

Figure 3B:
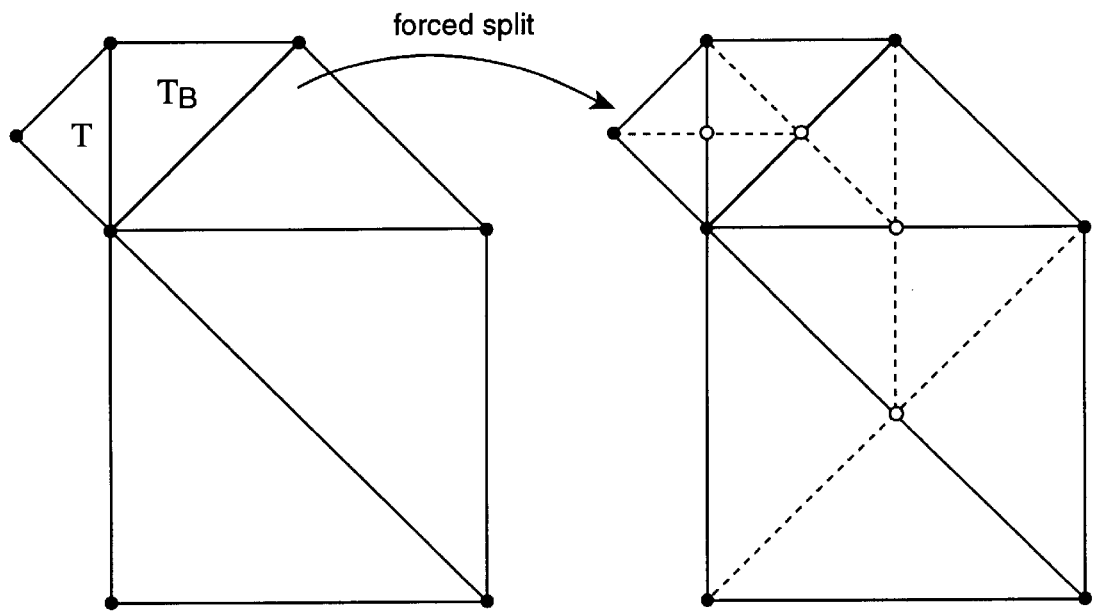
Figure 4:
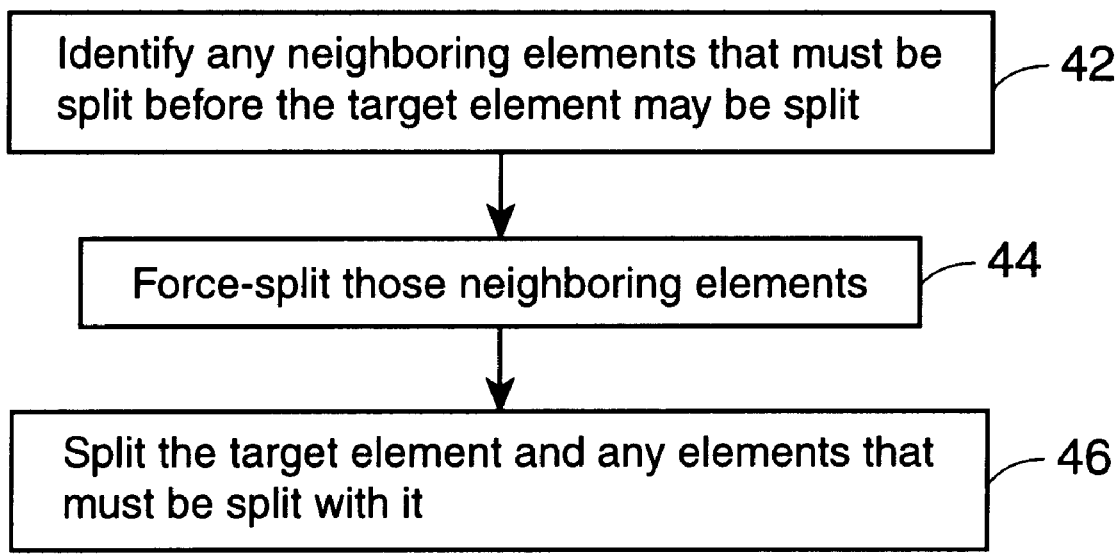
FIG. 4 is a flow chart of an exemplary process for force splitting an element.

A triangle T in a triangulation cannot be split immediately when its base neighbor $T_B$ is from a coarser level, as seen in FIG. 3B. To force T to be split, $T_B$ must be split first, which may require further splits in a recursive sequence. Such forced splits are needed for the optimization algorithm (FIGS. 4, 7, 10) to ensure a continuous representation of the terrain. Thus, the forced split process shown in FIG. 4 first identifies 42 any neighboring triangles (elements) that must be split (e.g., triangle $T_B$ in FIG. 3B) before the target triangle (e.g., triangle T in FIG. 3B). The neighboring element(s) are split. The target element is then split 46 along with any triangles that must also be split. A case requiring a total of four splits is depicted in FIG. 3B.

Base meshes of more than one triangle can be used to represent manifold surfaces of arbitrary genus with boundary. If the base mesh can be tiled with diamonds, then the split and merge operations may be used freely as in the case with a single root triangle. For terrain, a typical base mesh is a single diamond.

OVERVIEW

The present invention provides a process, ROAM, implemented in software for the rapid computer production of optimal-quality reduced-resolution representations of very large databases, as shown in FIG. 1.

Preprocessing 10 supports (a) constructing the elements from which meshes are made and (b) expediting the computation of the error metric which guides element subdivision. Preprocessing 10 activities are limited to world-space, view-independent computations whereas real-time 20 activities are generally directed at reducing view-dependent errors.

Preprocessing 10 starts at the bottom of the hierarchal representation, i.e., the finest level of representation. In an exemplary embodiment of the present invention, a square grid of terrain points with $n=2^m+1$ points per side is defined 12. There are $2^{m+1}=2^l$ triangles which reside at the bottom-most level l in the mesh. Therefore, there are l coarser levels of resolution "above" the grid.

The finest resolution (level l) triangles are assigned elevations from the initial grid. Triangles at level (l−1) are obtained by merging 14 adjoining triangles in level l as discussed above. Vertices of all triangles project directly onto grid points so that elevations are obtained by subsampling or other suitable sampling scheme.

World-space wedgie thicknesses, or error bounds 16 $e_T$, are assigned during pre-computation as discussed below. Since updating bounds is localized and fast, extending the real-time algorithm to deal with dynamic terrain is provided.

Preprocessing 10

1. Construction of a multi-resolution database 12, 14.

In order to be able to do this, the underlying input database must support a multi-resolution hierarchy. This includes at least all spatial databases of arbitrary dimension (not just d=2). The multi-resolution database contains a hierarchy defined between at least one "element" (such as a triangle) for each spatial region corresponding to the finest level of detail 12 that will be used and the coarsest level of detail, formed 14 by merging elements through the hierarchy of resolutions.

2. Compute 16 a view-independent error metric on individual elements.

View independence is necessary so that the error metric can be precomputed. The error metric must be at least "approximately monotonic".

3. Output 18 is a multi-resolution database with error bounds.

REAL-TIME PROCESSING

The real-time stage consists of the production of the database representation that is to be used for a particular view. The operation of the real-time algorithm in a digital computer effectively converts a general purpose computer into a database server appropriate for the production of real-time views for the database.

It is important to understand that, internally to the algorithm, the database representation consists, at any given point in the course of its construction, of a contiguous mesh of elements (e.g., triangles) drawn from varying levels of detail in the preprocessed database.

Real-Time 20

Figure 7:
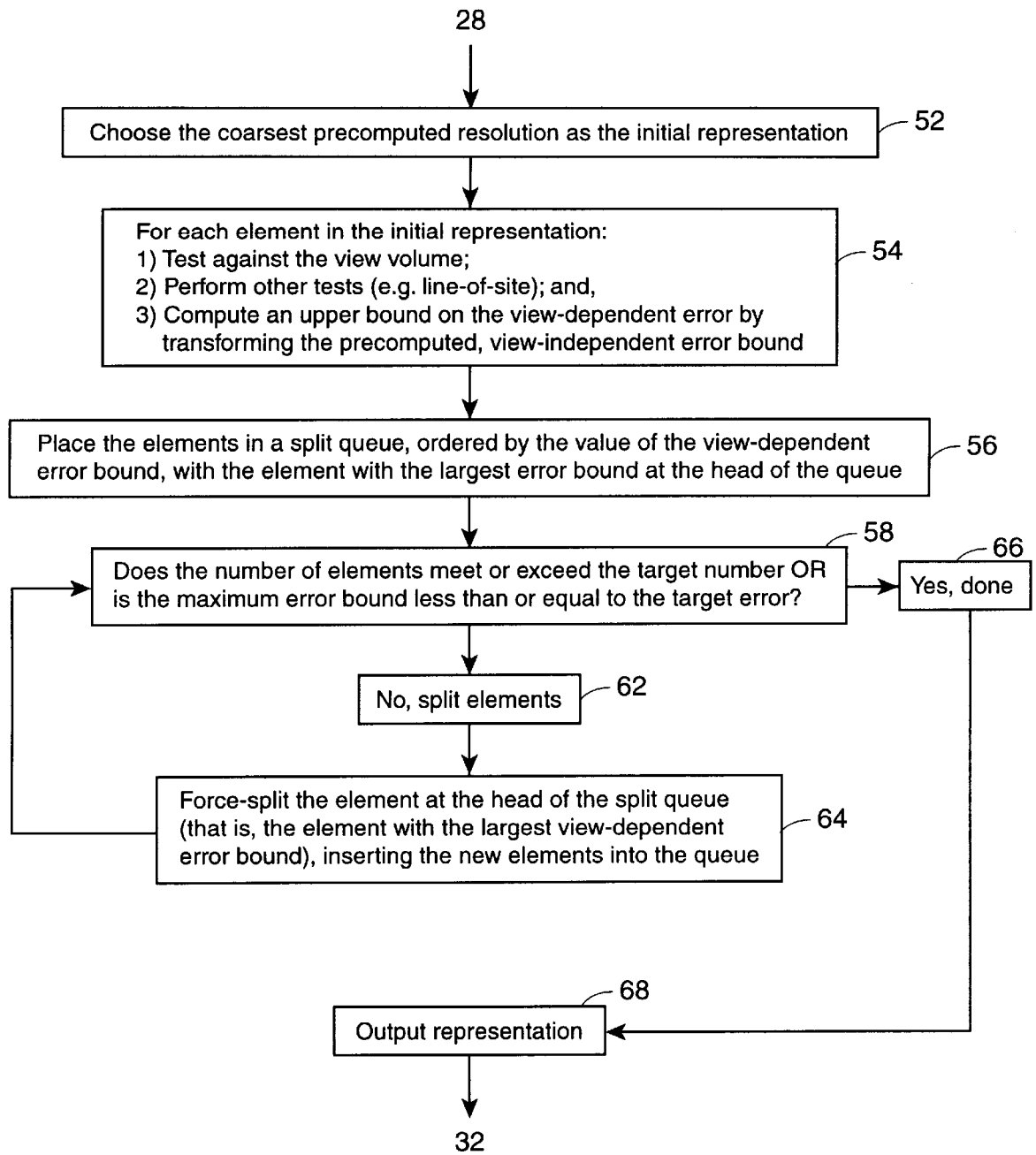
FIG. 7 is a flow chart of an exemplary process for producing a representation by only top-down refinement.
Figure 9:
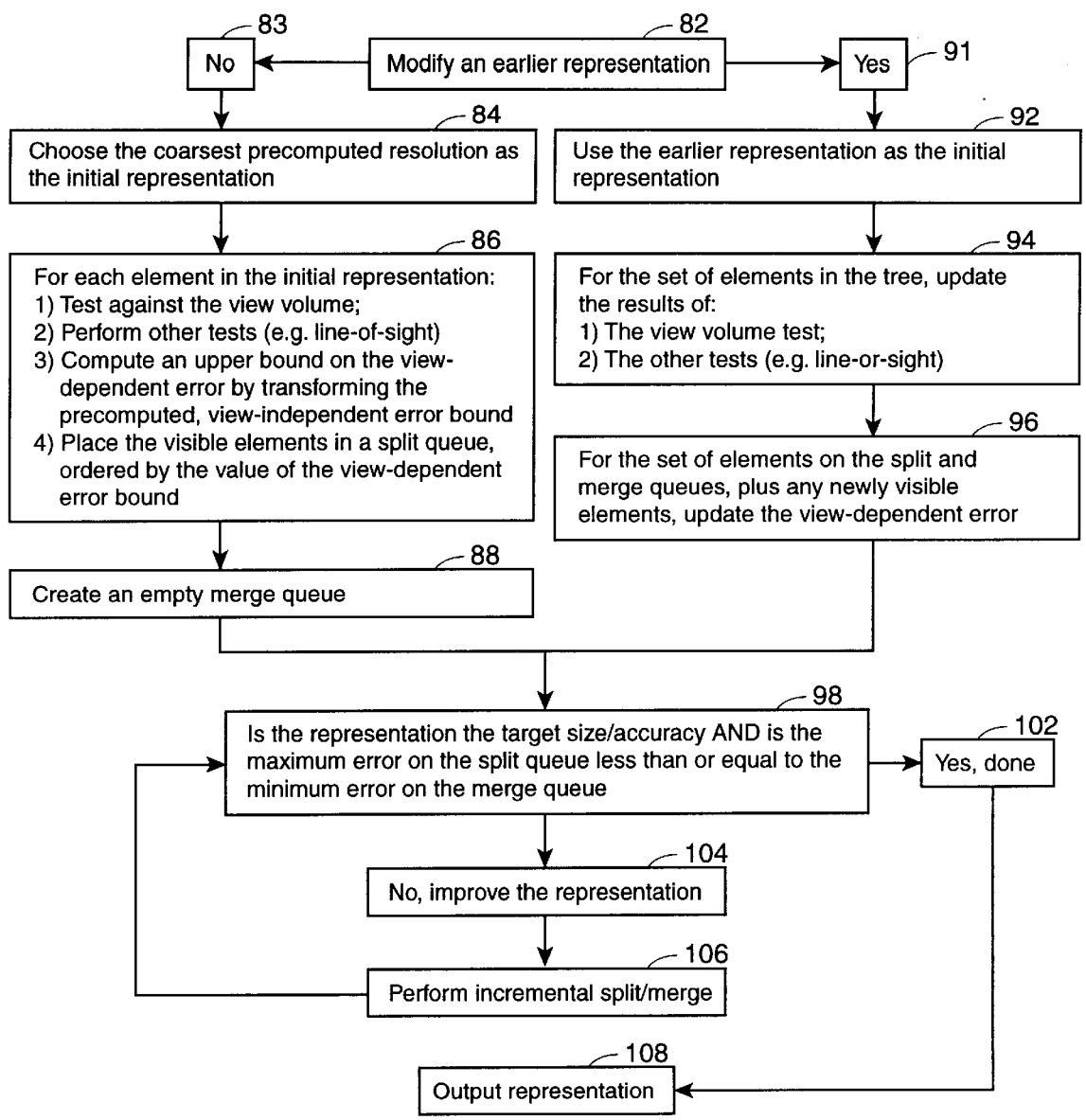
FIG. 9 is a flow chart of an exemplary process for producing a representation when doing incremental computations.

1. Connect 22 to the preprocessed multi-resolution database.
2. Select 24 an operating mode: 1) maintain a target number of elements; or 2) maintain a target maximum error bound. Combinations of these modes may also be used or multiple errors might be considered.
3. Establish 26 screen-view parameters in the database (e.g., location of the viewer and direction and field-of-view).
4. Produce 28 a first reduced resolution, view-dependent representation by projecting the preprocessed elements with error metrics onto the screen-view while selecting elements from the hierarchy to minimize an upper bound on the view-dependent error. This results in a first reduced-resolution representation of the database produced by top-down refinement (FIG. 7). The error minimization may be performed subject to a constraint on the total number of database elements used or on the maximum error reduced to a predefined value.
5. Update 32 the view parameters to, e.g., establish a new location of the viewer and/or the direction and field of view.
6. Produce 34 a next reduced resolution view representation by again minimizing an upper bound on the view-dependent error. This minimization can be done by either purely top-down refinement (FIG. 7) or incremental modification of the previous reduced resolution representation (FIG. 9).

ERROR METRICS

Queue priorities direct the order of processing elements for the view representations and are computed from various error metrics and bounds, described below. The following process is directed to a terrain database, but the process is not so limited. Assume that the vertex-to-world space mapping $w(v)$ is of the form $w(v)=(v_x,v_y,z(v))$, where $(v_x,v_y)$ are the domain coordinates of the vertex v, and $z(v)$ is the height at v. The affine height map for a bintree triangle T is denoted to be $Z_T(x,y)$. Assume also that camera coordinate systems and perspective transforms are given for each frame. The triangle-neighborhood notation used above is continued in the following discussion.

For height-map triangulations, a convenient bound per triangle T is a wedgie, defined as the volume of world space containing points (x,y,z) such that $(x,y)\epsilon T$ and $|z-z_T(x,y)| \leq e_T$ for some wedgie thickness $e_T \geq 0$. The line segment from $(x,y,z-e_T)$ to $(x,y,z+e_T)$ is referred to as the thickness segment for v. Nested wedgie bounds are built bottom-up, starting with $e_T=0$ for all T at finest level $l_{max}$. The wedgie thickness $e_T$ for a parent triangle is defined in terms of its children's wedgie thicknesses, $e_{T_0}$ and $e_{T_1}$, shown in FIG. 5. The tightest nested wedgie bounds are given by the formula $$e_T = \max\{e_{T_0}, e_{T_1}\} + |z(v_c) - z_T(v_c)|$$

where $z_T(v_c)=(z(v_0)+z(v_1))/2$, where $v_0, v_1, v_c$ are defined by FIG. 3A. Note that this computation is fast and localized, which facilitates dynamic terrain.

Figure 5:
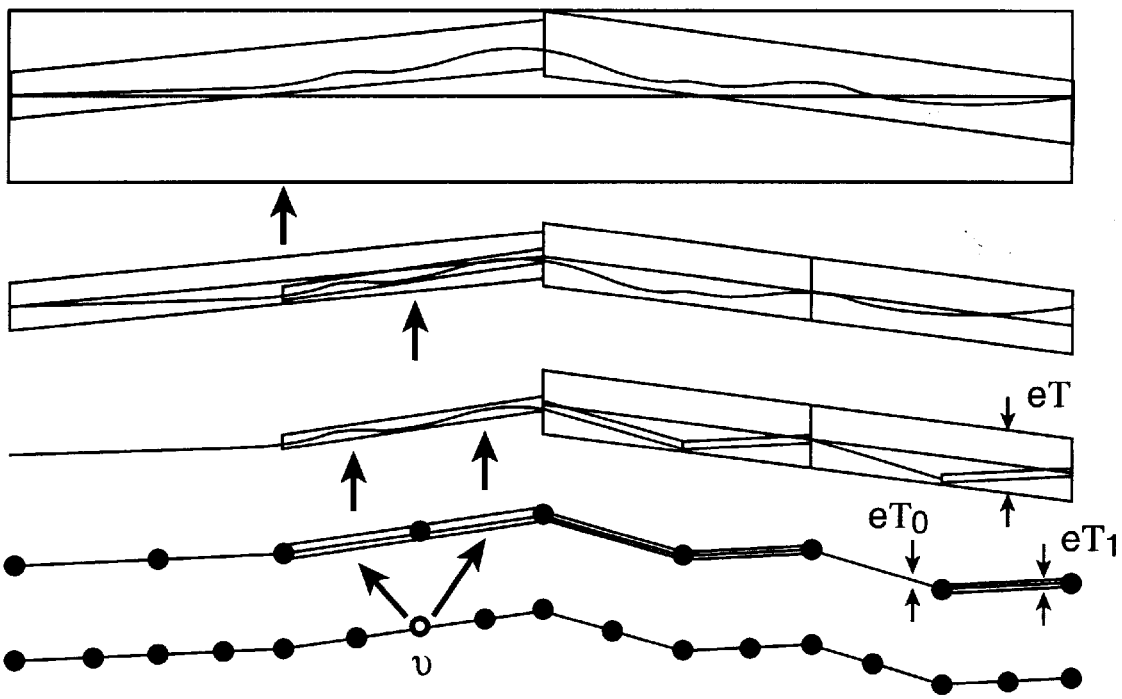
FIG. 5 pictorially illustrates a bottom-up pre-computation of wedge thickness.

A univariate example of nested wedgies is illustrated in FIG. 5, along with the chain of wedgies that depend from a particular vertex v from the finest representation (bottom) to the coarsest representation (top). Note that the error bounds monotically increase from bottom to top.

The image errors can be represented as purely geometric distortions or errors: the distance between where each surface point should be in screen space and where the triangulation places the point. Over the whole image, the maximum of these pointwise errors is measured. This error metric is the base metric for ROAM since the error metric can be artificially set to improve resolution along distinguished lines-of-sight. Formally, let $s(v)$ be the exact screen-space position vector for a domain point v, and $S_T(v)$ be the approximate position vector from triangulation T. Define the pointwise geometric distortion, or error, at v to be $dist(v)=\|s(v)-s_T(v)\|_2$, i.e., the magnitude of the resulting vector. For the whole image, define the maximum distortion to be $dist_{max}=\max_{v \epsilon V} dist(v)$ where V is the set of domain points v whose world-space positions $w(v)$ are within the view frustum. This is the error metric that is to be minimized.

In practice an upper bound is computed for the maximum error. For each triangle T in the triangulation, a local upper bound on error is obtained by projecting T's wedgie into screen space. The bound is defined as the maximum length of the projected thickness segments over all $v \epsilon T$. These local bounds are monotonic, and are used to form queue priorities. The maximum split-queue priority provides an upper bound on the maximum error over the entire image. If a wedgie extends behind the near clipping plane of the view volume, the triangle's priority is set to an artificial maximum value and the distortion-bound computation is skipped. This assures that elements whose wedgies intersect the near clipping plane are always refined.

Because of the peculiarities of the perspective transform, the maximum projected wedgie thickness does not always occur at one of the triangle vertices. This leads to the following upper bound computation. Let (p,q,r) be the camera-space coordinates of a point $w(v)$ without perspective, and without loss of generality assume the perspective projection is of the form $s=(p|r,q|r)$. The screen-space error at $v \epsilon T$ is bounded by projecting the thickness segment at v. Let (a,b,c) be the camera-space vector corresponding to world-space thickness vector $(0,0,e_T)$. The screen-space error at v is bounded by $$\overline{dist}(v) = \left\| \frac{p+a}{r+c} - \frac{p-a}{r-c}, \frac{q+b}{r+c} - \frac{q-b}{r-c} \right\|_2$$

This can be rewritten as $$\overline{dist}(v) = \frac{2}{r^2 - c^2}((ar - cp)^2 + (br - cq)^2)^{1/2}$$

It is straightforward to show that the minimum of $r^2-c^2$ and the maximum of $(ar-cp)^2+(br-cq)^2$ occur at the corner vertices of T (although not generally the same corner). An upper bound on the error $\overline{dist}(v)$ can thus be obtained by substituting these minimum and maximum values into the formulas.

Queue priority may be derived solely from the screen-error bound for a triangle T. This priority can be modified to ensure that selected lines of sight are correctly occluded or not. A simple method to do this is to change the priorities for any triangles whose wedgies intersect the LOS. By setting these priorities to an artificial maximum value, splits will be made preferentially in a manner sufficient to ensure exact visibility along the LOS. This method tends to promote more triangle splits than necessary, although this excess is typically small in practice compared to the overall triangle count. An example of LOS correction is given below.

There are other possible error metric/priority variations that are compatible with ROAM:

Backface detail reduction: Using nested Gauss-map normal bounds, priorities can be set to a minimum for triangles whose subtree of triangles are all back-facing.

Normal distortions: For specular highlights, determined by normal vectors interpolated from the vertices, priority can be given to triangles having large normal distortions where the highlights occur.

Texture-coordinate distortion: For curved mappings from surface domain to texture coordinates, priority should be added proportionate to the size of the screen-space position distortions associated with the texture-coordinate approximation.

Silhouette edges: Specific emphasis can be placed on triangles whose normal bounds indicate potential back-face to front-face transitions.

View frustum: Wedgies outside the six clipping planes can be given minimum priority.

Atmospheric obscurance: Wedgie priorities can be decreased where fog reduces visibility.

Object positioning: To exactly position objects on terrain, the priorities of triangles under each object can be artificially increased. This list can be expanded to suit a variety of applications.

"GREEDY" PROCESSING

For subdivision determinate meshes and monotonic error metrics the greedy algorithm shown in FIG. 7 is optimal: it produces a minimum error mesh with a prescribed number of triangles. Split and merge operations provide a flexible framework for making fine-grained updates to a triangulation. The greedy algorithm drives the split and merge process: keep priorities for every triangle in the triangulation, starting with the base triangulation, and repeatedly do a forced split of the highest-priority triangle.

This process is shown in FIG. 7 and creates a sequence of triangulations that minimize the maximum priority (which is typically an error bound) at every step. The only requirement to ensure this optimality is that priorities should be monotonic, meaning a child's priority is not larger than its parent's priority (if the priorities are at least "approximately monotonic", then optimality can often be recovered in practice). Adding a second priority queue for mergeable diamonds allows the greedy algorithm to start from a previous optimal triangulation when the priorities have changed, and, thus, take advantage of frame-to-frame coherence.

Suppose that every bintree triangle T is given a monotonic priority $p(T) \in [0,1]$. As triangulation T is built top-down, a priority queue $Q_s$ is maintained that contains all of the current triangles in T. The top-down greedy algorithm is the following:

Let T=the base triangulation 52
Clear $Q_s$.
Compute priorities 54 for T's triangles as determined from the view volume, upper bound on view-dependent error, and application-specific tasks (e.g., line-of-sight).
For all T T, insert T into $Q_s$ 56.
While T is too small (number of elements) or inaccurate (value of error bound) 58{
   Identify highest-priority T in $Q_s$.
   Force-split T 64.
     Update split queue as follows:{
      Remove T and other split triangles from $Q_s$.
      Add any new triangles in T to $Q_s$
     }
}

The maximum screen-space error bounds OR the number of elements are determined 58. If the number of elements meets or exceeds the target number, i.e., not too small, or the maximum error bounds are less than or equal to the target error, i.e., not too inaccurate, the task is completed 66 and a new representation is outputted 68. If not, the element at the head of the split queue is force split 64 and the new elements are inserted in the queue. The process returns for a new determination 58 of error bounds or number of elements.

SIMPLE ELEMENT SPLIT

Figure 8:
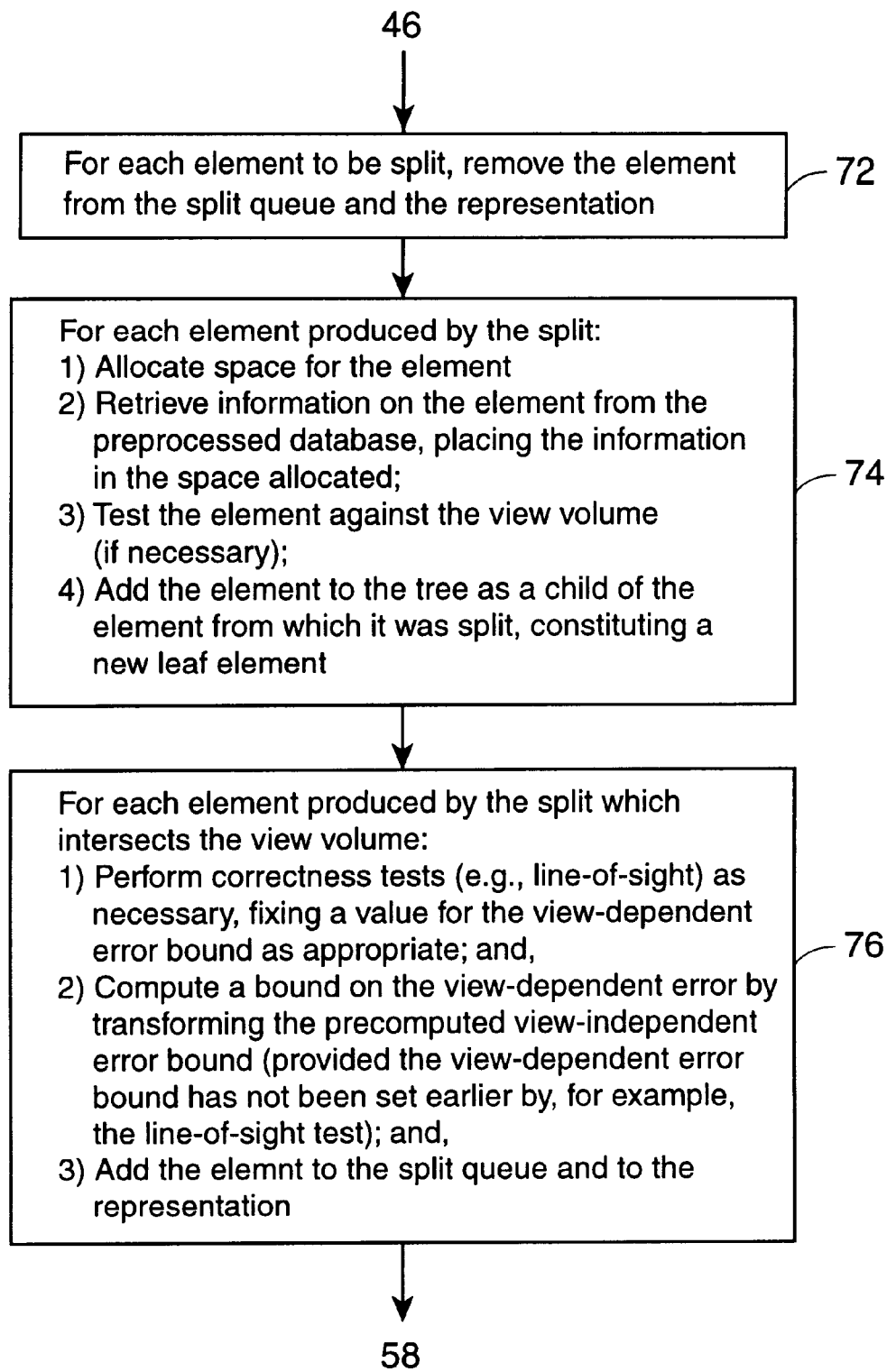
FIG. 8 is a flow chart of an exemplary process doing a simple split when doing only top-down refinement.

FIG. 8 depicts a process for performing a simple element split when doing only top down refinement. Each element to be split is first removed 72 from the split queue and from the representation. After allocating storage for the products of the split basic information on each element produced by the split, e.g., vertice locations, elevations at the vertices, error bounds, and the like, is retrieved 74 from the preprocessed database. The element is tested against the view volume (FIG. 14), if it is not known if the parent is in the view volume or not (labeled DONT-KNOW, explained below). The test identifies elements produced by the splits that intersect the view-volume. For other identified elements a view-dependent error bound is computed 76 (FIG. 21) from the precomputed error bound and the new elements are placed on the split queue as a child of the element from which it was split, constituting a new leaf element.

The line-of-sight and other tests are performed only on the elements that intersect the view-volume. The computation of the view-dependent error is not performed on elements that must be refined in order to get a line-of-sight exact since the error bound on these elements has been set to the maximum in order to ensure that the elements will be refined. This is also true for elements that must be refined to get any distinguished feature exact.

INCREMENTAL COMPUTATION

The term "incremental computation" means that a structure is computed incrementally, as follows:

1. At each time step, the structure is computed using the structure from the previous time step as the starting point (as opposed to starting from scratch each time); and
2. The goal of incremental computation is for the number of computations necessary to compute the structure to grow more slowly than n, the number of elements in the structure. The ideal is for the number of computations to scale as Δn, the number of elements that have split or merged since the last time step.

FIG. 9 depicts a process for producing a representation when doing incremental computation. First, a determination is made 82 whether an earlier representation is to be modified, i.e., whether there is an earlier representation and whether the number of elements to be modified is below a certain threshold. If an earlier representation is not to be modified 23 then an initial representation is formed 84 from the coarsest precomputed resolution. Each element in the initial representation is then processed 86 to be placed in a split queue. The processing 86 includes testing the element against the view volume (FIG. 14), performing other selected tests (e.g., line-of-sight, FIG. 23), and computing (FIG. 21) an upper bound on the view-dependent error by transforming the precomputed, view-independent error bound. The elements that are in the view volume are placed in a split queue that is ordered by the value of the view-dependent error bound. Finally, the process creates 88 an empty merge queue.

If an earlier representation is to be modified 91, the earlier representation is used 92 as the initial representation. Now there will be both split and merge queues with elements that must be updated 94 with respect to the view volume test (FIG. 14) and other selected tests (e.g., line-of-sight, FIG. 23). For the set of elements on the split or merge queues, or any newly visible elements, the view-dependent error is updated 96.

The resulting trial representation is then queried 98 to determine if the representation is the target size/accuracy AND if the maximum error on the split queue is less than or equal to the minimum error on the merge queue. The representation is the target accuracy if there is a target number of elements and the number of elements is equal to the target. The representation is the target accuracy if there is target maximum error and the maximum error on the split queue is less than or equal to that target error. If so 102, the process is complete and a new representation is outputted 108. If not 104, incremental split/merge operations are performed 106 to form new representations that are queried 98 until the accuracy/error threshold is met 102.

INCREMENTAL SPLIT AND MERGE

Figure 10:
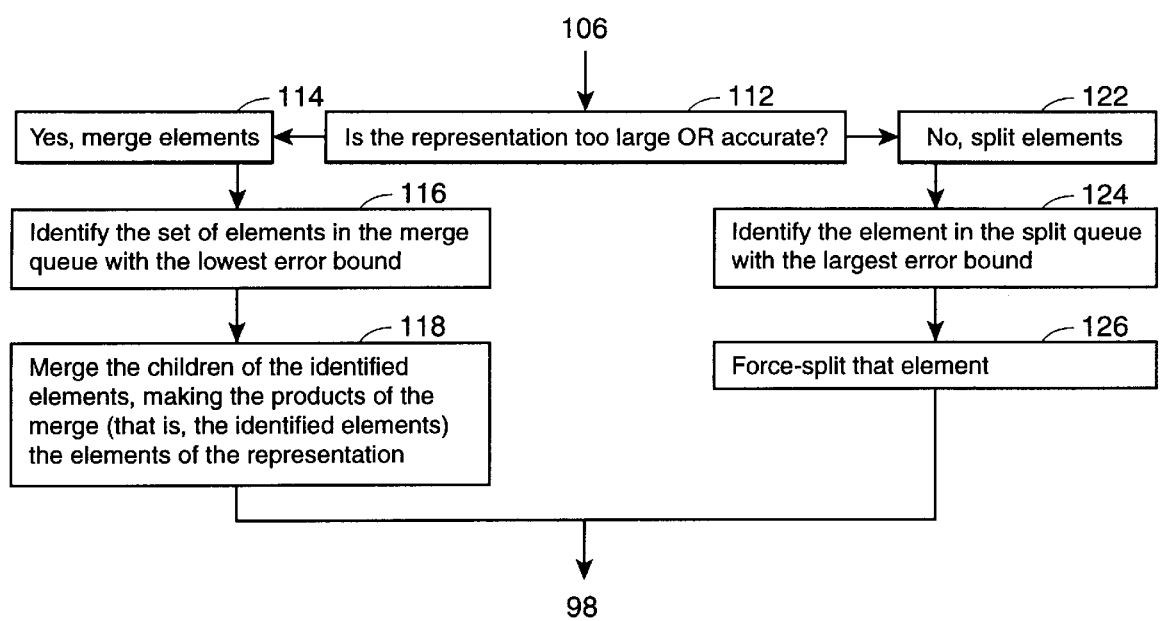
FIG. 10 is a flow chart of an exemplary process for performing an incremental split and merge.

To optimize for real-time performance, an incremental version of the queue algorithm shown in FIG. 10 reuses information from the last frame. Reuse implies being able to merge elements and therefore keeping track of the priorities of all elements that have been recently split, (mergeable elements), so that elements with the lowest priority can be merged first. The incremental algorithm consists of merging elements and splitting elements until the error metric is minimized 42 (FIG. 7). Two queues are needed: the previously-described split queue, and a new merge queue which contains all mergeable elements.

The items on the merge queue actually are sets of mergeable elements. Each set consists of elements that were split together and that must therefore be merged together. The view-dependent error of a merge set is the maximum view-dependent error of its elements.

FIG. 10 depicts an incremental split and merge process 106. The representation is first examined 112 either to determine if the number of elements exceeds the target number of elements (representation too large) or to determine if the error bounds are less than the preselected minimum error (representation too accurate). If the selected condition is met 114, then elements are merged to reduce the number of elements and increase the lowest error bound. The set of elements in the merge queue with the lowest error bound is identified 116. The children of the identified elements are merged 118 and the products of the merge step become the elements of the new representation for further query 98 (FIG. 9).

It the selected condition is not met, then the elements are split 122. The element in the split queue with the largest error bound is identified 124. That element is force split 126 and the resulting representation is returned for further query 98.

SIMPLE SPLIT FOR INCREMENTAL COMPUTATION

Figure 11:
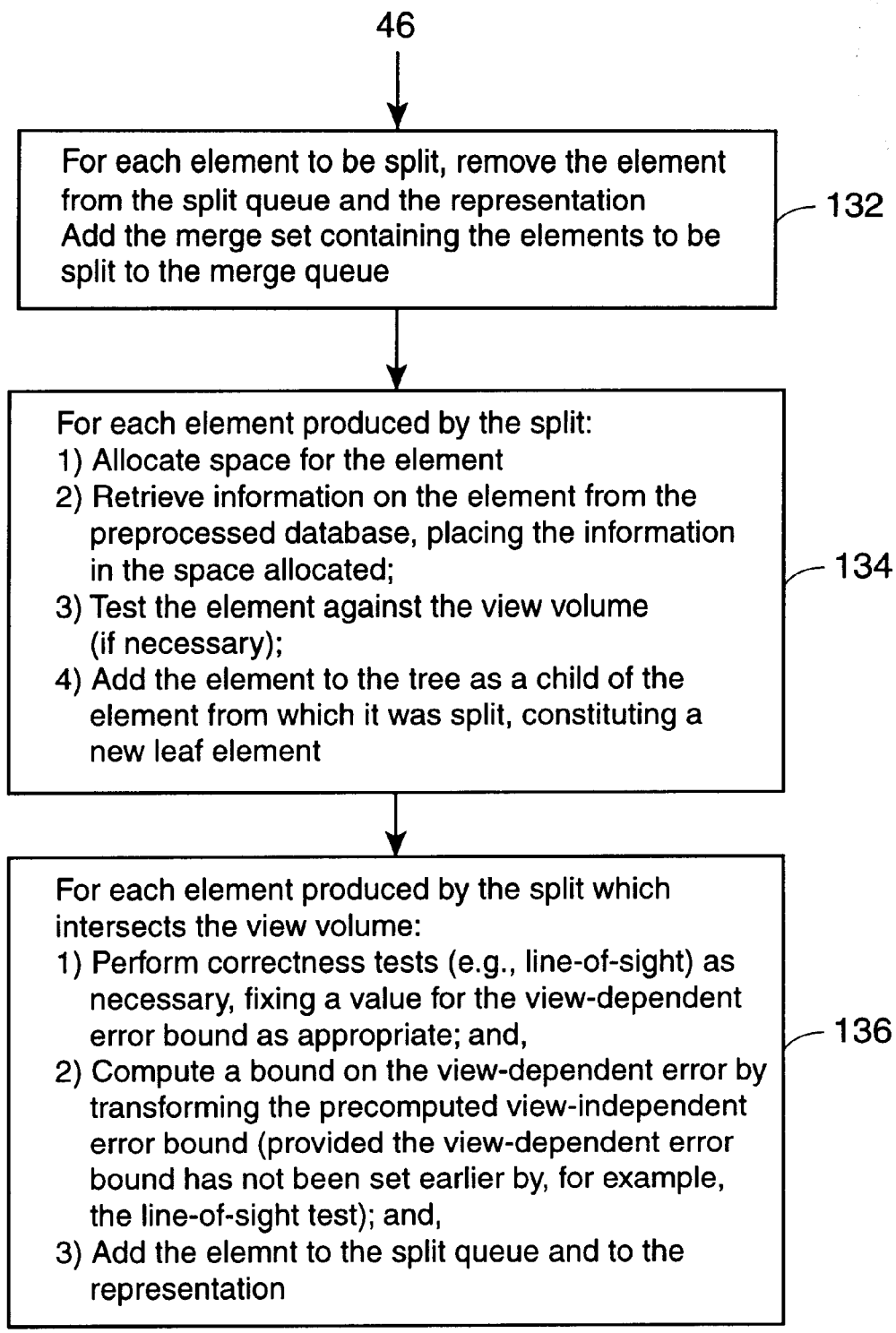
FIG. 11 is a flow chart of an exemplary process for performing a simple split when doing incremental computation.

Referring now to FIG. 11, there is shown a process diagram for splitting 46 (FIG. 5 an element. Each element to be split is first removed 132 from the split queue and the representation and the merge set containing the elements to be split is added to the merge queue. The elements on the merge queue are sets of elements that can be formed by merging elements that are in the current representation. The set of elements that have just been split will be so mergeable immediately after the split. Note that the placement of a set of elements on the merge queue is determined by the largest error of the elements in the set.

Each element produced by the split is then further processed 134. After allocating storage for the products of the split basic information on each element produced by the split, e.g., vertice locations, elevations at the vertices, error bounds, and the like, is retrieved from the preprocessed database. The element is tested against the view volume (FIG. 14), if it is not known whether the parent is in the view volume or not (labeled DONT-KNOW, explained below). The test identifies elements produced by the splits that intersect the view-volume. For other identified elements a view-dependent error bound is computed 76 (FIG. 21) from the precomputed error bound and the new elements are added to the tree as a child of the element from which it was split, constituting a new leaf element.

The line-of-sight and other tests 136 are performed only on the elements that intersect the view-volume. A bound on the view-dependent error is computing by transforming the precomputed view-independent error bound. The computation of the view-dependent error is not performed on elements that must be refined in order to get a line-of-sight exact since the error bound on these elements has been set to the maximum in order to ensure that the elements will be refined. The resulting elements are added to the split queue and the representation.

MERGING ELEMENTS

Figure 12:
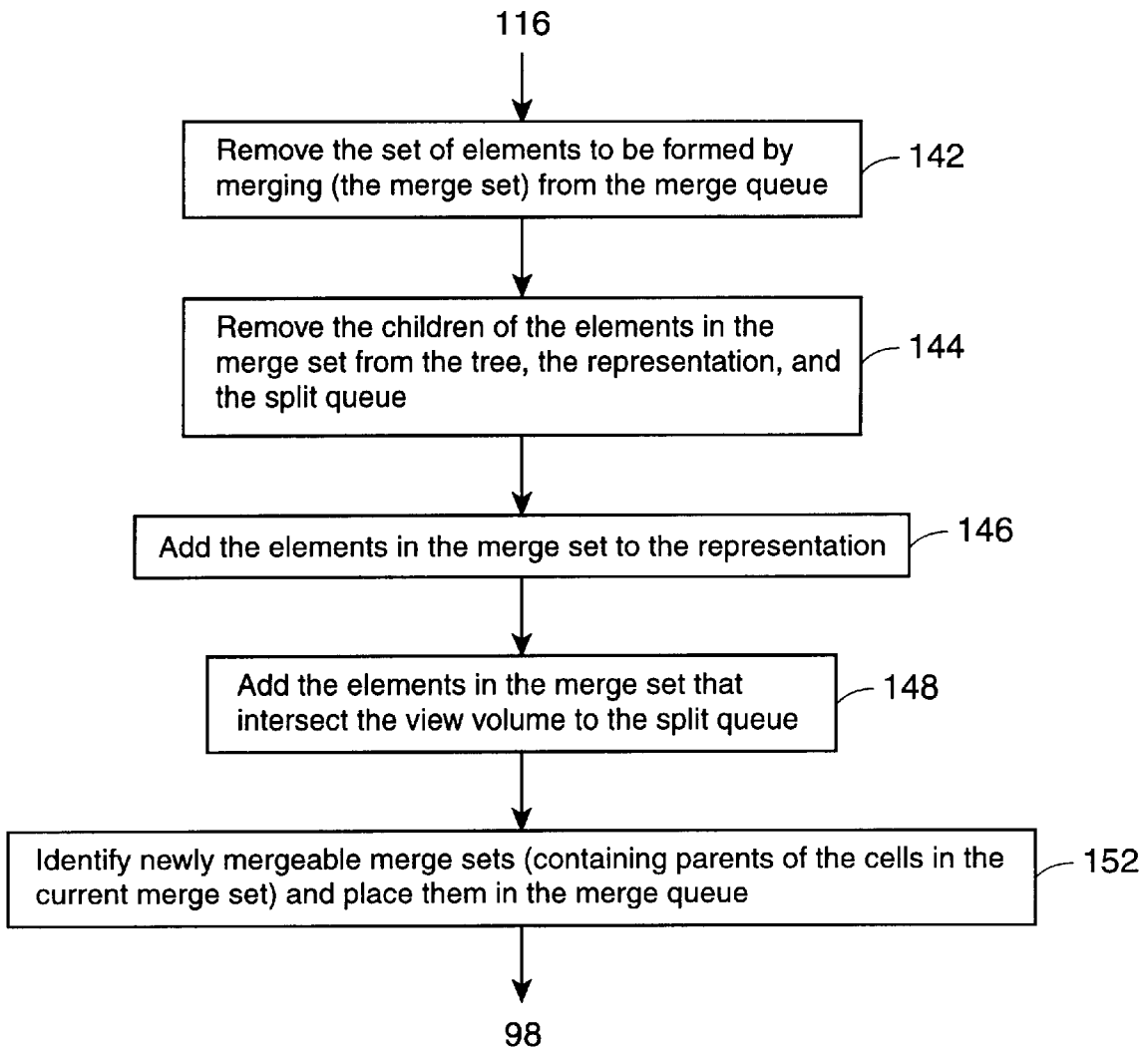
FIG. 12 is a flow chart of an exemplary process for merging cells.

FIG. 12 depicts a process for merging elements. The set of elements to be formed by merging (the merge set) is removed 142 from the merge queue. The children of the elements in the merge set are removed 144 from the representation and the split queue. The elements in the merge set are added 146 to the representation and those elements in the merge set that intersect the view volume are added 148 to the split queue. Newly mergeable merge sets (containing parents of the elements in the current merge set) are identified 152 and placed in the merge queue 152.

TEST FOR INTERSECTION WITH THE VIEW VOLUME

The view volume is taken to be a truncated pyramid (frustum). The visibility of each wedgie is determined by classifying it with respect to the six halfspaces that define the current view volume . Each wedgie has an IN flag for each of the six halfspaces and an overall label which can take the values OUT, ALL-IN, or DONT-KNOW An IN flag is set if the wedgie is entirely inside the corresponding halfspace. The label is OUT if the wedgie is wholly outside one of the halfspaces, ALL-IN if it is wholly inside all of the halfspaces (all IN flags set), or DONT-KNOWotherwise. Since parent wedgies fully contain their children, a wedgie inherits any of its parent's IN flags which are set as well as a label value of OUT or ALL-IN. In addition, if a wedgie was labeled OUT or ALL-IN for the previous frame and these labels are exact for the current frame, then the subtree descending from that wedgie does not need to be updated. These properties make it possible to do efficient incremental culling with the following process.

Classification proceeds by top-down, recursive traversal of the terrain tree. A call to the classification function for a wedgie, W, begins with W inheriting any set IN flags from its parent as well as any label value of OUT or ALL-IN. Then, if there is no inherited label value, W is checked against the halfspaces not marked IN, setting new IN flags as appropriate. If at any point in the examination process W is found to be entirely outside any of the halfspaces, it is marked OUT. If, at the end of the process, all its IN flags are set, W is marked ALL-IN. Then, if Ws label has changed from the last frame or if the label value is DONT-KNOW, the classification process proceeds with Ws children. Finally, the call to the classification function for W returns.

Figure 13:
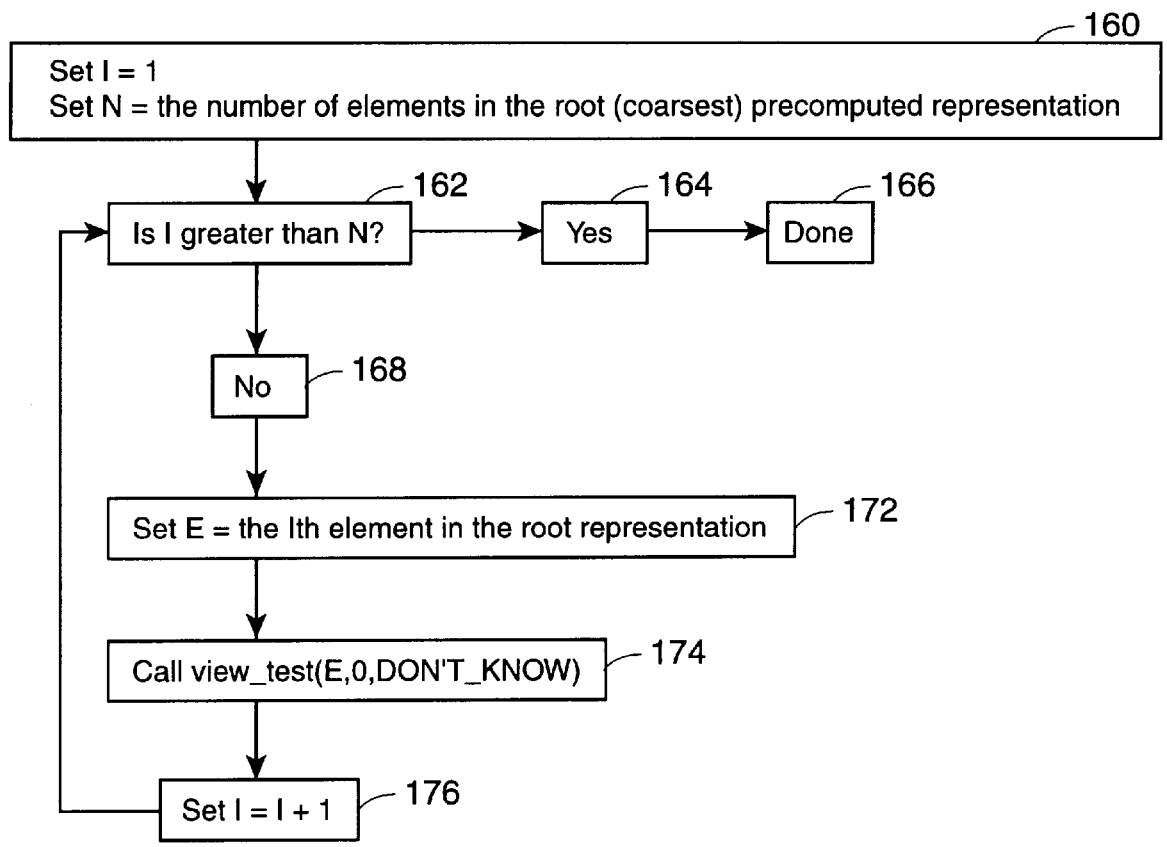
FIG. 13 is a flow chart of an exemplary process for performing an incremental test for element intersection with the view volume.

FIG. 13 calls for up-dating a view-volume test or testing elements against the view-volume. The object of the test is to identify elements that are entirely within the view-volume, entirely outside the view-volume, or that straddle the planes defining the view-volume (i.e., label as "DON'T KNOW"). Each element in the hierarchy is appropriately labeled for use in further processing. The test is initialized 160 by setting N to the number of elements in the root (i.e., coarsest) precomputed resolution and set element identity I=1. Check 162 whether I>N. If so 164, the test is completed 166. If not 168, set 172 E=I th element in the root representation. The process then calls 174 the view-test process (FIG. 14) to label E as ALL-IN, ALL-OUT, or DONT KNOW. Set 176 I=I+1, and check 162 the value of I.

RECURSIVE, INCREMENTAL TEST FOR ELEMENT/VIEW-VOLUME INTERSECTION

Figure 14:
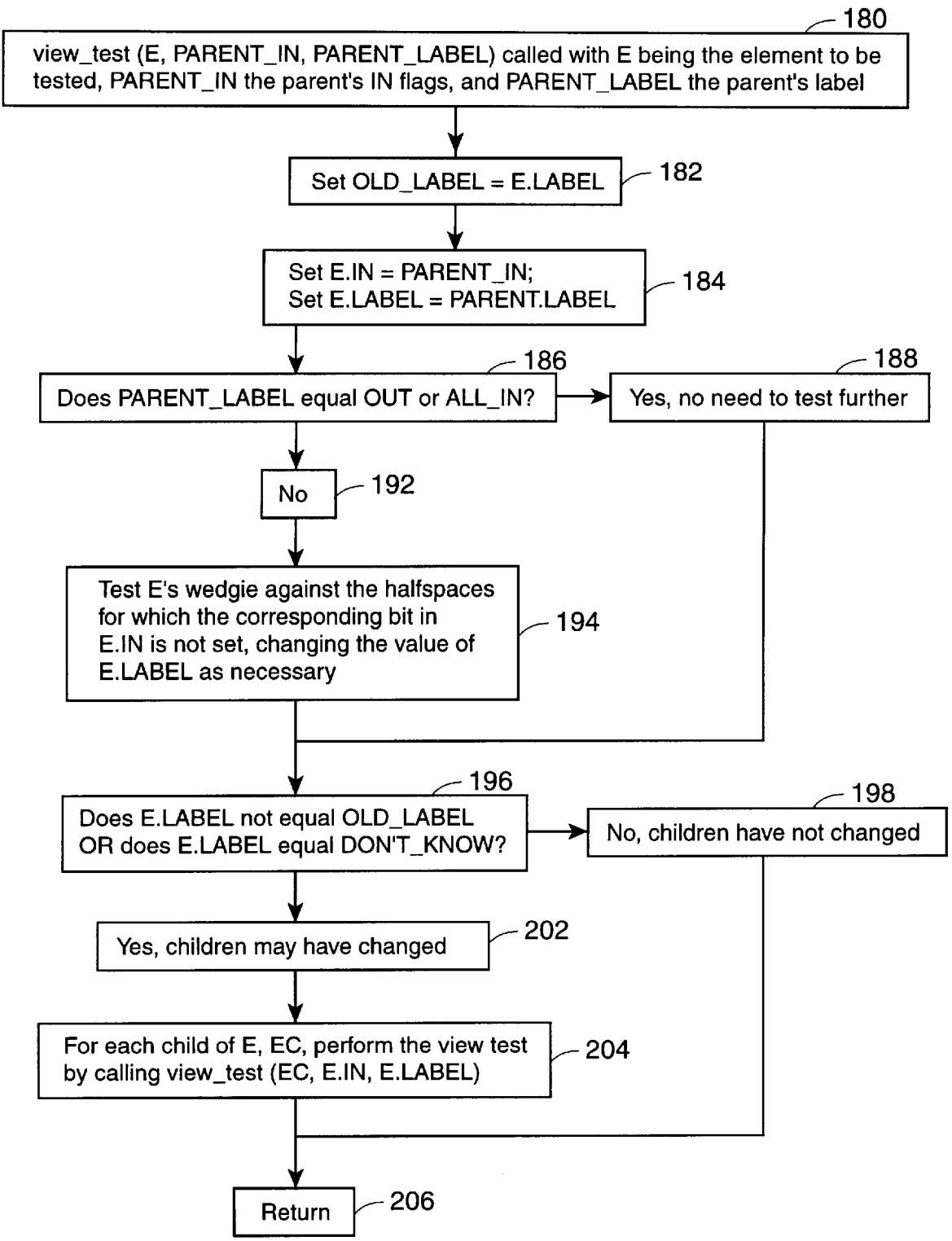
FIG. 14 is a flow chart of an exemplary process for a recursive, incremental test for intersection of a cell with the view volume.

FIG. 14 depicts the view-volume test that is called (e.g., call 174, FIG. 13) to test 180 element E having parent's IN flags PARENT_IN and parent's label PARENT_LABEL. Set 182 OLD_LABEL to E.LABEL and set 184 E.IN= PARENT_IN and E.LABEL=PARENT.LABEL. Check 186 if PARENT_LABEL is equal to OUT or to ALL.IN. If so 188, testing is complete since the children have the same characteristic as the parent in these cases. If not 192, then test 194 E against the halfspaces (FIG. 15) for which the corresponding bit in E.IN is not set, changing the value of E.LABEL as necessary. The halfspaces determine the boundaries of the view-volume that are compared with the location of the element, as noted above.

The output from process steps 188 and 194 are queried 196 to determine whether E.LABEL does not equal OLD_ LABEL or whether E.LABEL equals DON'T_KNOW. If not 198, the children have not changed and the process completes 206. If yes 202, the children may have changed and a view-test is performed by calling 204 view_test(EC, E.IN, E.LABEL).

TESTING ELEMENT AGAINST HALFSPACES

Figure 15:
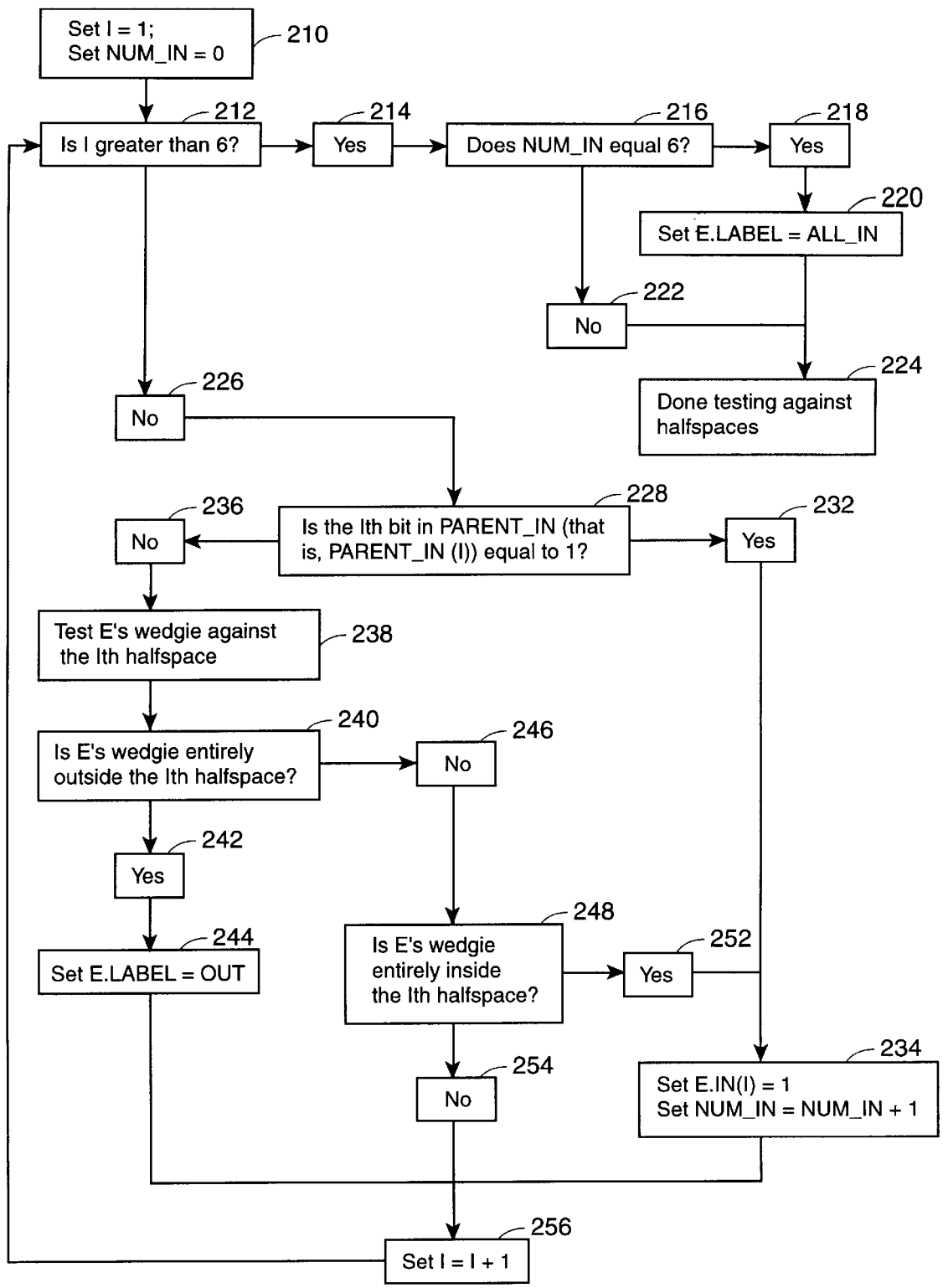
FIG. 15 is a flow chart of an exemplary process for testing an element against the view volume halfspaces and adjusting the element label as required.

FIG. 15 depicts a process for testing the location of an element against the halfspace planes defining a view-volume and adjusting the element location label (ALL-IN, ALL-OUT, or DONT KNOW) as required. The process indices are initialized 210 by setting I=1 and NUM_IN=0. The process first determines if all of the halfspaces have been examined 212 by determining if I is greater than 6. If so 216, the process then determines 216 if NUM_IN is equal to 6. If so 218, E.LABEL is set 220 as ALL_IN, and the process testing against the halfspaces is complete 224. If not 222, the process testing is complete 224 without setting E.LABEL.

If I is not 226 greater than 6, the Ith bit in PARENT_IN is compared 228 to 1. If the bit is equal 232 to 1, the bit E.IN(I) IS set 234 and NUM_IN is set to NUM_IN= NUM_IN+1.

If PARENT_IN(I) is not 236 equal to 1, E is tested 238 against the I th halfspace. First, determine 240 if E's wedgie is entirely outside the Ith halfspace. If so 242, set 244 E.LABEL to OUT. If not 246, determine 248 if E's wedgie is entirely inside the Ith halfspace. If so 252, set the bit E.IN(I) to 1 and increment 234 NUM_IN. A negative 254 determination, or the output from step 244 or step 234, increments 256 I to I+1 and returns to determination 212 whether all the halfspaces have been examined.

INCREMENTAL ADDITION OF A TRIANGLE TO MESH REPRESENTATION

Figure 6:
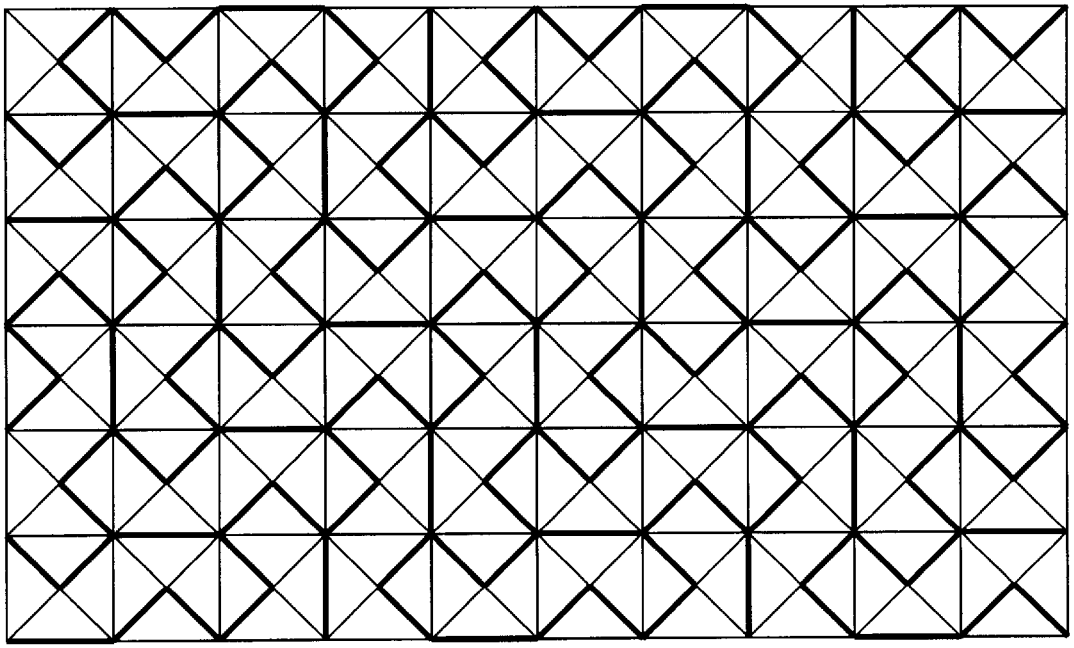
FIG. 6 graphically depicts a tiling of the plane by triangle-strips of 8 uniformly-sized triangles.
Figure 16:
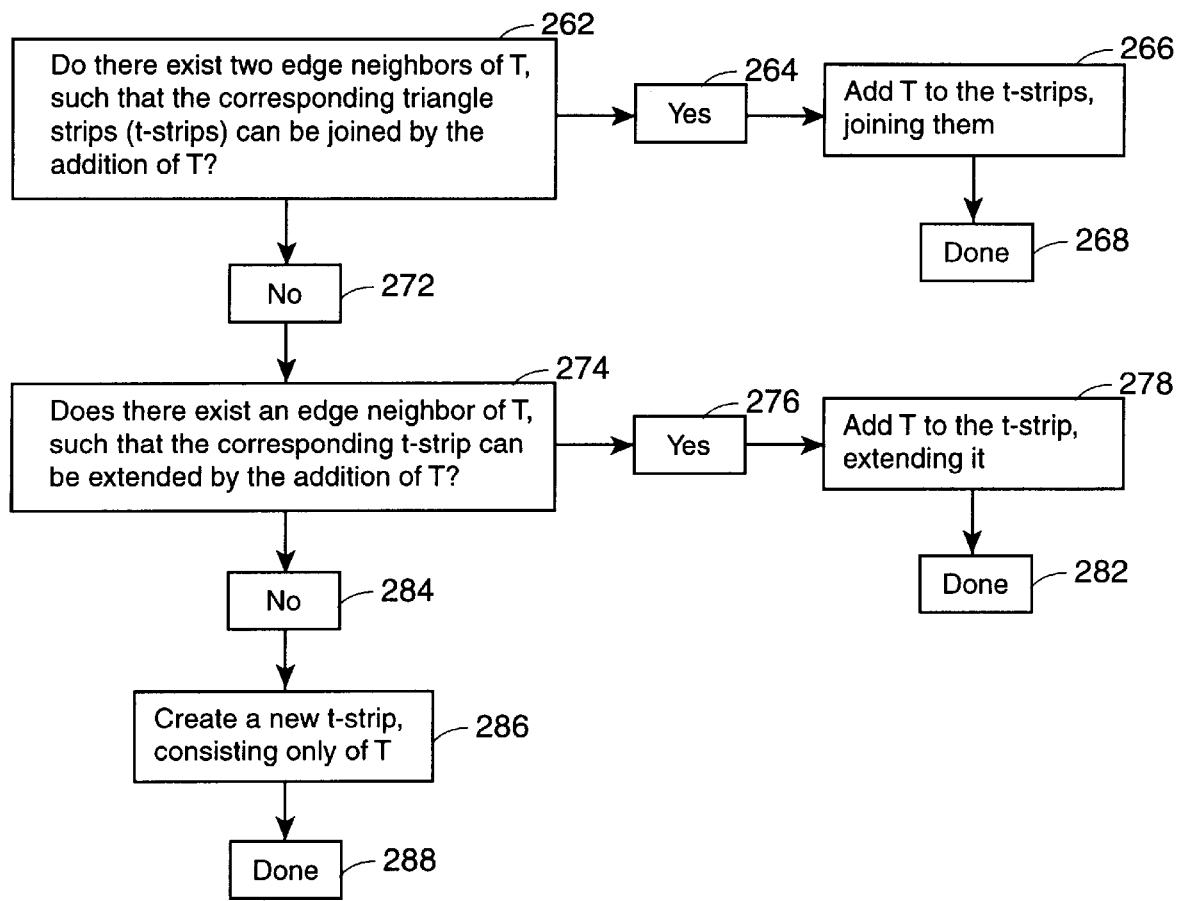
FIG. 16 is a flow chart of an exemplary process for performing an incremental update of the triangle mesh representation to add a triangle.

FIG. 16 depicts the process for adding a triangle T to the triangle mesh representation if called, e.g., by the processes shown in FIGS. 6, 8, 9, and 10. The process of the present invention conventionally uses "triangle strips (t-strips) to provide triangle information to the graphics hardware. The mesh triangles are assembled into OpenGL (a graphics standard) triangle strips, as shown in FIG. 6, to improve rendering performance. See, e.g., *Open GL Programming Guide*, ed. Woo et al., pp. 43–45 (Addison-Wesley Developers Press, 1997).

Optimal generation of the triangle strips for a general (non-uniform) frame is difficult. A simple, sub-optimal, incremental approach is used. New triangles produced by splitting and merging are reassigned to appropriate strips while attempting to keep the average number of triangles per strip as high as possible. For each new triangle, ROAM first tries to use it to join it with two of its neighboring strips. If this is unsuccessful, it tries to extend one neighboring strip. If this also fails, a new strip with a single triangle is created. The incremental algorithm produces an average triangle count of about 4.5 triangles per strip with almost negligible addition in CPU time to the split/merge algorithm.

The process first determines 262 whether there exist two edge neighbors of T such that the corresponding t-strips can be joined by the addition of T. If so 264, T is added 266 to the t-strips, joining the strips and the process is complete 268. If not 272, the process then determines 274 if there exists an edge neighbor of T such that the corresponding t-strip can be extended by the addition of T. If so 276, T is added 278 to extend the t-strip and the process is complete 278. If not 284, a new t-strip is created 286 consisting only of T and the process is complete 288.

DEFERRED ERROR UPDATING

Figure 17:
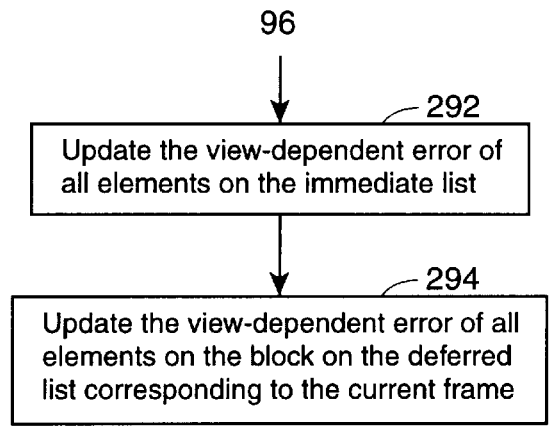
FIG. 17 is a flow chart of an exemplary process for deferred element updating.

FIG. 17 depicts a process for updating (see step 96, FIG. 9) the view-dependent error of the set of elements in the split and merge queues and the newly visible elements. This process updates 292 the view-dependent error of all elements on the immediate list and then updates 294 the view-dependent error of all elements on the block of the deferred list corresponding to the current frame. The updated errors are returned for further processing 98 (FIG. 9).

PLACING AN ELEMENT ON IMMEDIATE/DEFERRED LISTS

The projected errors of the triangles change as the viewing position changes. Recalculating priorities for these triangles for every frame is too costly. Rather, triangle priorities are incrementally calculated as shown in FIG. 9. Each triangle on the split and merge queues are allotted to one of two lists, an immediate list or a deferred list. Triangles on the immediate list have their priorities calculated every frame. Triangles on the deferred list are calculated in batches, a few per frame, in such a way that all triangles in the deferred list are guaranteed to be calculated periodically, e.g., every ten frames.

Each triangle is assigned to an appropriate list by estimating its projected error several frames in advance, e.g., 10 frames. In one approach, a velocity bound is used for the viewing position and the triangle is assumed to advance directly towards the viewing position. Alternately, an acceleration bound could be used. Either method provides a conservative estimate of the change in priority. If the estimated error indicates that the triangle may be split or merged within, e.g., ten time steps, it is put on the immediate list. Otherwise it is deferred. A heuristic method (FIGS. 19 and 20) is used to translate a triangle's estimated error into a determination as to whether or not it will need to be split or merged within the requisite number of frames. It is deemed that a triangle may have to be split (merged) if its estimated error lies above (below) a certain threshold on the split (merge) queue. The thresholds for the split and merge queues are calculated for each frame and vary slowly from frame to frame. They are set by requiring that approximately 5 percent of the triangles on either the split or the merge queue have priorities that are between the calculated threshold and the maximum priority on the split queue (minimum priority on the merge queue).

This incremental algorithm results in an almost order of magnitude decrease in the CPU time needed to recalculate queue priorities for each frame.

Figure 18:
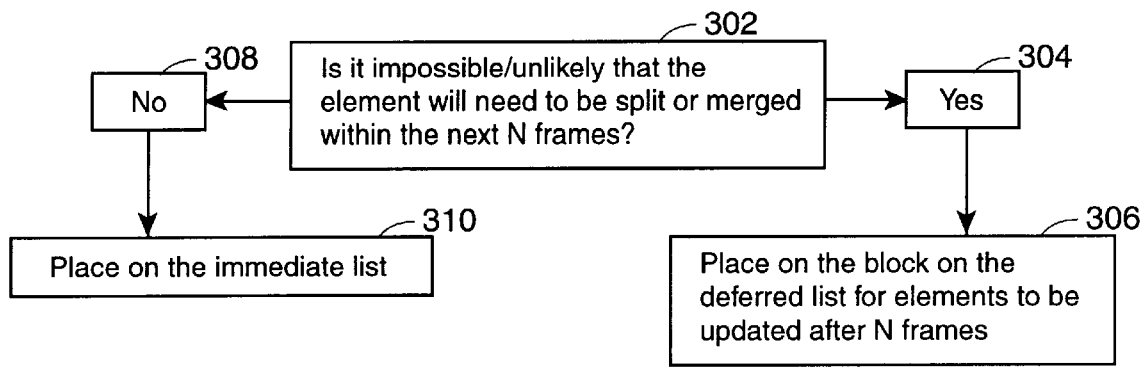
FIG. 18 is a flow chart of an exemplary process for placing an element on one of the immediate or deferred lists.

FIG. 18 depicts a process for placing an element in either the immediate list or the deferred list for computing a view-dependent error for the element. A element is examined 302 to determine if it is impossible or unlikely that the element will need to be split or merged within the next N frames. If so 304, the element is placed in the block on the deferred list for elements to be updated after N frames.

If not 308, the element is placed 310 on the immediate list to be updated.

COMPUTING SPLIT/MERGE QUEUE THRESHOLDS

Figure 19:
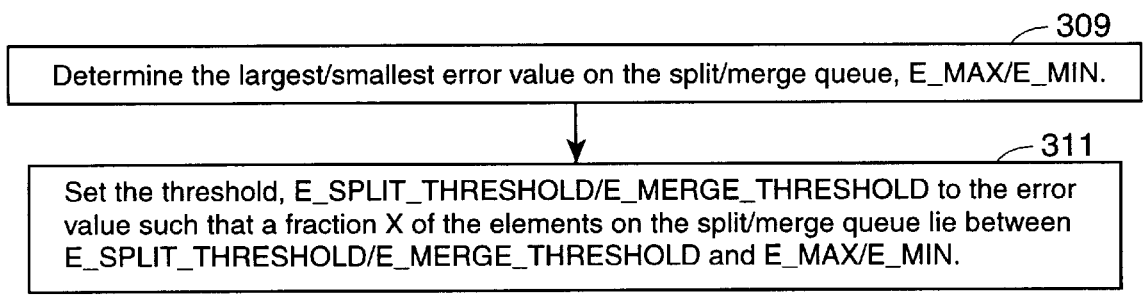
FIG. 19 is a flow chart of an exemplary process for computing the thresholds for the split and merge queues.

FIG. 19 depicts a process for determining thresholds for use in making decisions to place elements on a deferred list. A fraction X of elements is selected to be between an error metric threshold for deferred computation and the maximum/minimum error metric values to ensure that an element does not cross current minimum/maximum queue values within a selected number of frames. Thus, the process first determines 309 the largest/smallest error value on the split/merge queues, E_MAX/E_MIN. Then the threshold value of E_MAX/E_MIN is set 311 to the error value such that a fraction X of the elements on the split/merge queue lies between E_SPLIT/MERGE_THRESHOLD and E_MAX/E_MIN.

DETERMINING NEED TO SPLIT/MERGE AN ELEMENT AFTER N FRAMES

Figure 20:
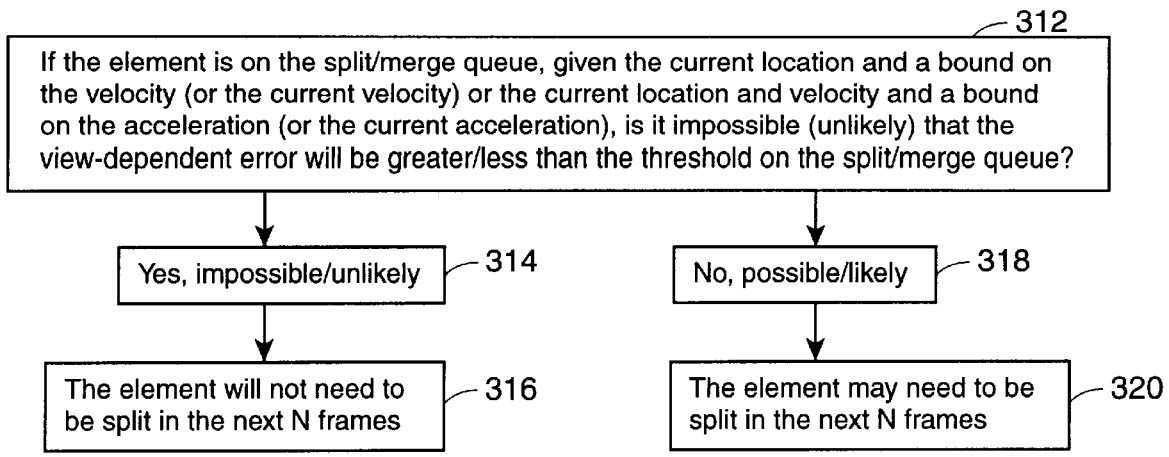
FIG. 20 is a flow chart of an exemplary process for determining whether or not an element may need to be split or merged in the next N frames.

FIG. 20 depicts a process for determining (step 302, FIG. 19) the likelihood that a element may need to be split or merged in the next N frames as the view location moves. The process first determines 312 for an element in the split/merge queues, given the current location and a bound on the velocity (or the current velocity) or the current location and velocity and a bound on the acceleration (or the current acceleration), if it is impossible (unlikely) that the view-dependent error will exceed/will be less than the threshold on the split/merge queues within N frames. If the event is impossible or unlikely 314, the element is placed 316 on the deferred list for split/merge operations, If the event is possible or likely 318, the element is retained in the immediate list for split/merge operations.

COMPUTATION OF SCREEN-SPACE ERROR

Figure 21:
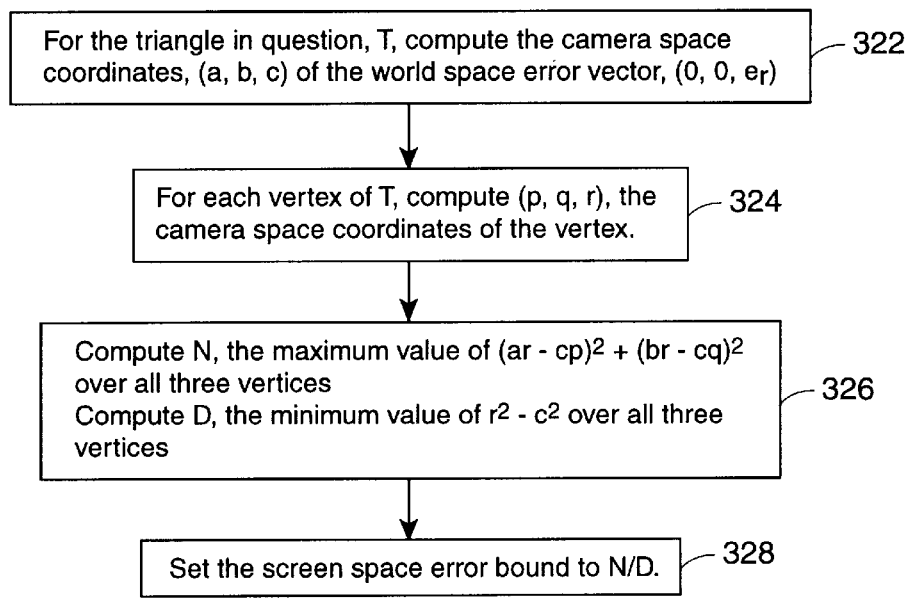
FIG. 21 is a flow chart of an exemplary process for computing screen-space error by transformation of the pre-computed world-space error.

FIG. 21 depicts a process for computing screen-space error bounds, as called by the processes shown in FIGS. 7, 8, 9, and 11 by transformation of the precomputed world-space error, as explained above. For a selected triangle, T, the camera space coordinates (a, b, c) of the world space error vector $(0, 0, e_T)$ are computed 322. For each vertex of T, the camera space coordinates (p, q, r) of each vertex are computed 324 from conventional geometric projections from the world-space view to camera-space. Next the error bounds are obtained by computing 326 N, the maximum value of $(ar-cp)^2+(br-cq)^2$ over all three vertices, and D, the minimum value of $r^2-c^2$. The screen error bound is set 328 as N/D.

UPDATE OF LINE-OF-SIGHT LISTS

Figure 22:
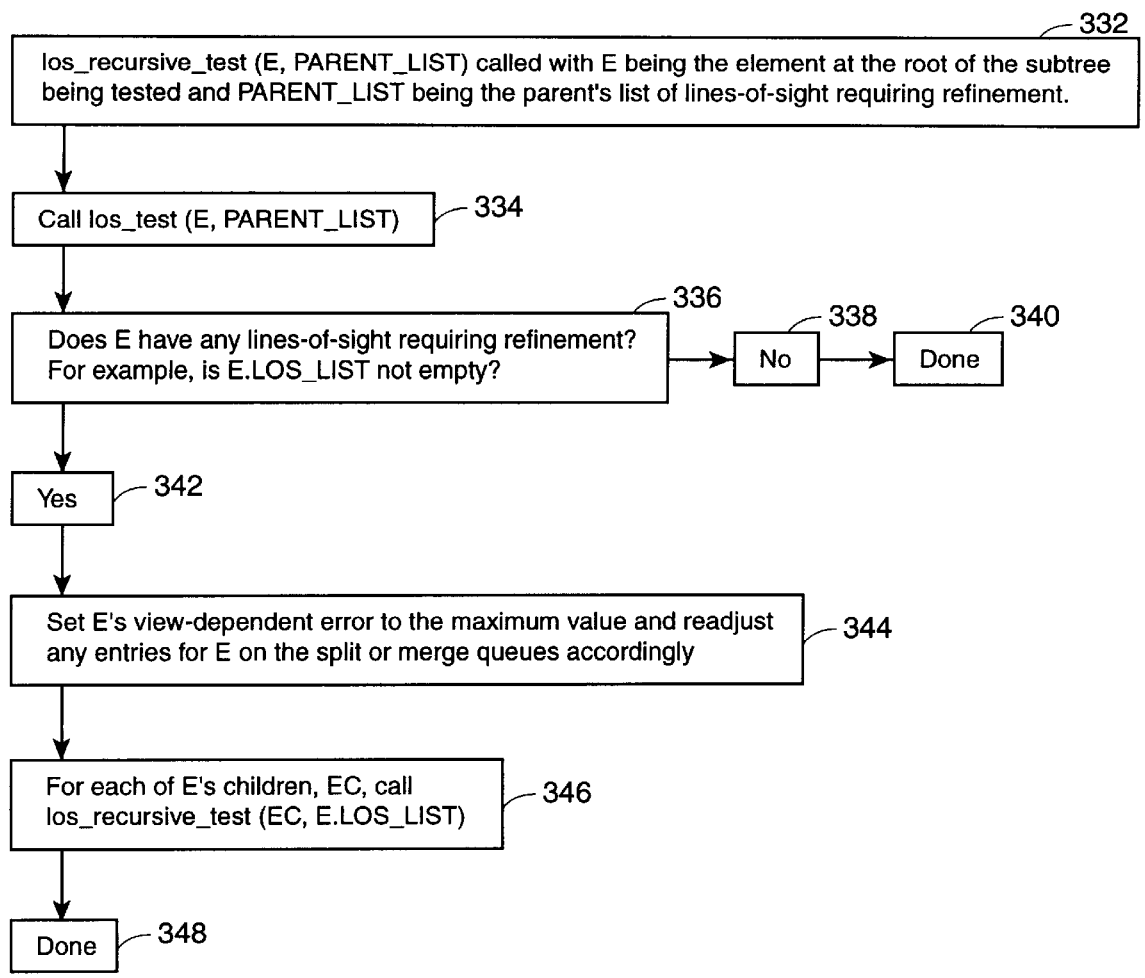
FIG. 22 is a flow chart of an exemplary process for incremental, hierarchal updating of line-of-sight lists.

FIG. 22 depicts a process for incrementally updating the results of the line-of-sight test, that is, process step 94 in FIG. 9. The process is presented as a recursive function los_recursive_test(E., PARENT_LIST). (Note that the function does not exist under this name in the terrain embodiment.) In the argument list to los_recursive_test, E is the element at the root of the subtree being tested and PARENT_LIST is a list of lines of sight against which E is to be tested. Note that, when E has a parent, PARENT_LIST will be the list of lines of sight that require the parent to be refined, hence the name for this dummy variable.

The process of incremental updating is begun by calling los_recursive_test (ER, ALL_LOS) for each element in the coarsest representation, ER, where ALL_LOS is a list of all lines of sight that are currently selected. Within los_recursive_test, the process first calls 334 los_test(E, PARENT_LIST), FIG. 23. Los_test produces E.LOS_LIST, a list of lines of sight that require E to be refined. It is then determined 336 whether there are any lines of sight requiring E to be refined, that is, whether E.LOS_LIST is not empty. If not 338, the test is complete 340. If so 342, the view-dependent error of E is set 344 to the maximum error bound and any entries for E on the split or merge queues are readjusted accordingly. The process is repeated 346 for each of E's children, EC, by calling los_recursive_test(EC, E.LOS_LIST). Collectively, these calls to los_recursive_test for E's children update the results of the line-of-sight test for the entire subtree descending from E. When the calls to los_recursive_test for E's children have completed, the test for E is complete 348.

TESTING ELEMENTS FOR INTERSECTION WITH DISTINGUISHED LINES-OF-SIGHT

A particular feature that can be guaranteed to be exact in terrain representations produced by the ROAM server is the line of sight to a distinguished location. In accordance with this invention, the following process is implemented:

1. Top-down algorithm
    As in the basic ROAM algorithm for construction of a terrain representation, the algorithm examines coarser levels of detail before finer levels.
2. Use of precomputed error bounds to guide refinement
    The precomputed error bounds on a terrain element are used to determine whether or not it is possible that the element, e.g., a triangle, or any element formed from it by refinement, intersects a particular line of sight.
3. Stopping refinement when it is determined that further refinement will not change the line of sight
    If intersection is possible, then the element is marked for refinement.
    If intersection is not possible then refinement for the purpose of obtaining a exact line of sight is terminated for that element and its children.

In the current implementation, refinement is insured by assigning the maximum value of screen-space error to the element (that is, it is put at the head of the split queue). Conversely, when intersection cannot occur, the element is simply allowed to take the place in the queue that it would normally occupy.

The algorithm described above determines when a terrain element and any elements formed from it by refinement cannot possibly intersect a line of sight and stops refinement accordingly. It does not, however, determine when a line-of-sight intersection must occur (that is, when a terrain element and any terrain representations formed from it by refinement must intersect the line-of-sight).

It is possible in some cases to determine that a line-of-sight intersection must occur. In particular, if a line-of-sight intersects both the top and bottom of the wedgie that is defined by the terrain element and its error bounds, then an intersection must occur.

The ability to test for this condition (and terminate refinement when it is detected) has been incorporated in the ROAM server although not in the code that constructs terrain representations for real time scene generation. Rather, this enhancement to the algorithm is incorporated in the code that responds to line-of-sight queries. This code returns a simple Boolean answer—"yes" if a clear line of sight from the eye to the point in question exists, "no" otherwise. The code does its own top-down construction of a terrain representation in order to determine if a clear line of sight exists. In a given region, it terminates refinement if it determines that no intersection of the terrain with the line-of-sight is possible; but it also terminates refinement (and returns "no", indicating that no clear line-or-sight exists) if it determines that an intersection must occur.

Figure 23:
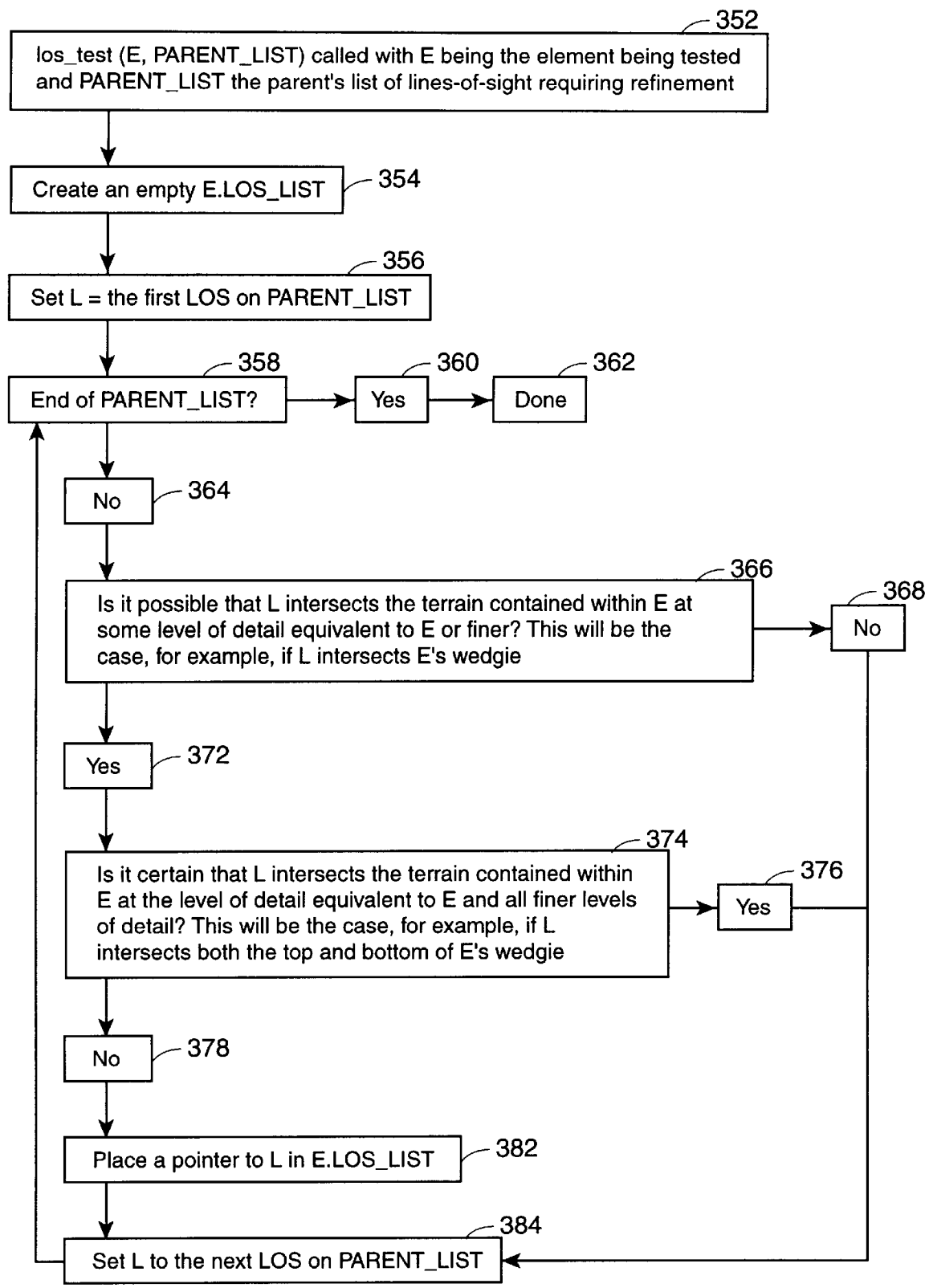
FIG. 23 is a flow chart of an exemplary process for testing an element for intersection with lines-of-sight.

FIG. 23 depicts a process for testing an element, E, for intersections of distinguished lines-of-sight. This call is a process step in, e.g., FIGS. 7, 8, 9, 11, and 22. Note that the test for certainty of intersection is not implemented in the part of the process that constructs a terrain representation for real-time scene generation, where the element is treated as if it is not certain that intersection occurs. The test is implemented in the part of the process that answers line-of-sight queries. The function los_test (E,PARENT_LIST) is called 352 with E being the element being tested and PARENT_LIST being the list of lines-of-sight L requiring refinement of the parent, produced when the function los_test 352 was called on the parent at the time the parent was produced. An empty list E.LOS_LIST is created 354 with L set 356 as the first LOS on PARENT_LIST. The process determines if it is at the end of the PARENT_LIST 358. If so 360, the test is done 362. If not 364, it is first determined 366 if it is possible that L intersects the terrain contained by E at some level of detail equivalent to E or finer, such as, e.g., if L intersects E's wedgie. If not 368, the process returns to increment 384 L to the next LOS on PARENT_LIST. If it is possible 372, it is then determined 374 whether it is certain that L intersects the terrain contained with E at the level of detail equivalent to E and all finer levels of detail, such as, e.g., if L intersects both the top and bottom of E's wedgie. If so 376, L is incremented 384. If not 378, a pointer is placed 382 to L in E.LOS_LIST and L is incremented 384. The process repeats 358 these determinations until the process has reached the end 360 of PARENT_LIST.

GENERAL APPLICATION

The algorithm used to produce reduced-resolution terrain representations in which distinguished lines-of-sight are exact may be applied to other features of the terrain and to features of reduced-resolution representations of non-terrain databases. For a feature to be amenable to this treatment, it must have the following characteristic:

It must be possible, at least some of the time, to determine at a coarse level of detail, that further refinement will not change the feature.

Typically, this will be done using precomputed error bounds.

In addition, it will be possible to guarantee that the feature is exact with negligible performance penalty if the number of additional refinements necessary to get the feature exact is small compared to the total number of refinements done in constructing the reduced-resolution representation.

Given the above, the essential features of the line-of-sight algorithm may be used almost verbatim to describe the broader scope of the invention:

1. Top-down algorithm
2. Use of precomputed error bounds to guide refinement
3. Stopping refinement when further refinement will not change the feature.

EVALUATION

Thus, the present invention provides the following performance when evaluated against specific performance criteria:

1. Time required to achieve a given triangle count: ROAM can maintain an optimized mesh containing thousands of triangles at 30 frames per second for high-speed, low-altitude flights over rough terrain. The algorithm's running time is proportionate to the number of triangle changes per frame, which is typically a few percent of the total mesh size. Hence, ROAM performance is insensitive to terrain database size, both in extent and resolution (with the caveat that all of the data must be in memory in the current implementation).

2. Flexibility in choosing view-dependent error metrics: ROAM uses maximum geometric distortion in screen space as a base metric and queue priority value. This metric can be enhanced in many ways: ensuring exact visibility along specified lines of sight, providing exact terrain positions under objects, and eliminating back-facing detail, for example.

3. Mesh representation (both pre-defined and run-time selected): ROAM uses a triangle bintree for precomputation, and builds continuous adaptive meshes by incremental, fine-grained split and merge steps. The triangles are always a right-isosceles shape, and therefore avoid the numerical problems of thin, "slivery" triangles.

4. Simplicity of algorithms: ROAM is simple to understand and implement because it is centered on split and merge operations of bintree triangles whose structure naturally avoids the complex case proliferation and legitimacy rules for selectively refining and coarsening within irregular or even quadtree-structured multiresolution spaces, and no special efforts are required to avoid discontinuities and thin triangles. The greedy priority-queue technique that drives the splits and merges provides a simple mechanism for incorporating an extensible set of error-metric enhancements.

5. Quality of mesh at a given triangle count: ROAM produces optimal meshes in the sense of minimizing the maximum error bound for monotonic bounds (bounds that do not get larger after a split operation). Of course, this optimum is achieved over a particular choice of mesh space, and larger or better spaces of triangle meshes certainly exist. The results in actual tests are qualitatively excellent.

6. Direct control of triangle counts: ROAM produces meshes with specified triangle count directly. Algorithms that admit only error tolerances can only indirectly control triangle counts by hunting for the corresponding error threshold, a process that is either slow or unreliable. ROAM can operate to achieve specified tolerances, but triangle-count specification is preferable for many applications.

7. Strict frame rates: ROAM can progressively optimize from frame-to-frame and stop when the frame time is about to expire (although typically only a fraction of the frame time is required). A motivating application, aircraft sensor stimulation, requires a strict frame rate governed by the equipment under test. In conjunction with processor locking or real-time operating systems on multi-processor graphics systems, ROAM provides a strict frame rate at the highest triangle counts that the graphics hardware can handle reliably. Of course, early termination yields non-optimal triangulations. However, because the split/merge steps are performed in decreasing order of importance, the partial work done is optimal in the sense that true optimal is approached as close as time permits while maintaining the specified triangle count.

8. Guaranteed error bounds: ROAM produces guaranteed bounds on geometric screen-space distortions. These bounds are obtained locally by a fast conversion from preprocessed world-space bounds to view-dependent screen-space bounds, and globally by the greedy nature of the optimization algorithm.

9. Memory requirements: ROAM distinguishes between preprocess data size and runtime size. The preprocess size is equal to the number of raw, finest-level height samples plus a single "thickness" value per bintree triangle. The runtime data structures take up space proportionate to the output mesh size, which is minuscule compared to the preprocess data size.

10. Dynamic terrain: Since ROAM preprocessing is fast and localized, the preprocessed data can be updated quickly when the terrain is changed by mud slides, explosions, etc.

11. Reduced "popping": ROAM's use of a screen-distortion metric and its tendency to make very few mesh changes per frame naturally reduces disturbing temporal artifacts (pops). In some cases, it is desirable to reduce pops further by vertex morphing, which is easily incorporated in ROAM.

12. General input meshes: Although the ROAM motivating application and implementation focuses on terrain (in the form of a height field), ROAM's mesh structure applies to manifolds of arbitrary genus with boundary.

In addition to these general criteria, ROAM was influenced by the specialized requirements of the motivating application, synthetic sensor stimulation for aircraft undergoing ground-based testing with hardware and human controllers in the loop. In this setting, it is critical to query a runtime terrain data server for line-of-sight (LOS) visibility tests, object positions, and so on, in addition to the texture and triangle-mesh queries used for display to multiple sensors with differing viewpoints and requirements for accuracy and frame rate.

Because of the approximations made to achieve high frame rates, the issues of consistency and exactness for the various queries become paramount. In one possible approach, LOS and other queries should be made with respect to a single current terrain approximation. This at least gives consistency to the various query responses, but requires a single "lowest common denominator" triangle mesh suitable for all views and sensor frame rates, thus degrading quality to unacceptable levels. In contrast to this approach the philosophy in ROAM is to give responses to LOS and position queries that are exact with respect to the finest-level input data, and to constrain each of the view-dependent meshes to preserve the selected LOS visibilities and positions. The ROAM architecture efficiently supports this philosophy, and thus ensures consistency through exactness.

A program listing for the aspects of ROAM in accordance with the present invention is attached hereto in microfiche format. This program listing represents an embodiment and is not intended to limit the scope of the invention. A publicly available program, GLUtility Tool Kit (GLUT), described in Kilgard, *Open GL, Programming for the X Window System*, (Addison-Wesley Developers Press, 1996), is called by ROAM to complete the processing steps described herein and is not included in the attached microfiche.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented process for producing view space representation data in real time from a world space database representing spatial data, comprising:
   (a) preprocessing the world space database, comprising the steps of:
   (b) forming a database having one element for each spatial region corresponding to a finest selected level of detail,
   (c) forming a multiresolution database by merging elements at the finest level of detail and subsequent intermediate levels of detail to define a hierarchy of element resolutions until a coarsest selected resolution is obtained,
   (d) computing a strict error metric for each element at each level of detail that is independent of parameters defining the view space and that is approximately monotonic to associate with the elements forming the multiresolution database, and
   (e) storing the multiresolution database and associated error metrics; and
   (f) processing the multiresolution database and associated strict error metrics in real time, comprising the steps of:
   (g) selecting view parameters for a view volume comprising a view location and field of view,
   (h) choosing elements with the coarsest resolution to form roots of subtrees of a tree for an initial representation data set,
   (i) performing a view volume test to select first elements from the initial representation data set that are at least partially within the view volume,
   (j) converting the strict view-independent error metric using the view parameters to a strict view-dependent error metric,
   (k) placing the first elements in a split queue ordered by the value of the strict view-dependent error metric where a first element having the largest error metric is placed at the head of the queue,
   (l) making a determination whether the number of first elements in the queue meet or exceed a predetermined number of elements or whether the largest error metric is less than or equal to a selected upper error metric bound,
   (m) if the determination in step (l) is negative, force splitting the element at the head of the queue, including:

removing the element from the split queue and the representation, splitting the element into its children, testing the children against the view volume if the parent was only partially in the view volume, adding the children to the tree as children of the elements from which they were split, constituting new leaf elements, inserting the children that are at least partially within the view volume into the split queue, (n) designating the children in the queue as first elements and repeat steps (l)–(m) until the determination is positive to form a set of second elements in the split queue as the representation data set, and (o) outputting the set of second elements as reduced resolution view space data representing the terrain features.

2. A process according to claim 1, further including:

determining whether each first element from the initial representation data set intersects a line of sight;

placing the first elements from the initial representation data set that intersect a line of sight at the head of the queue without determination of a strict view-dependent error bound;

during step (m) for each one of the children whose parent intersected a line of sight, determining whether each one of those children intersects a line of sight; and placing the resulting children that intersect the line of sight intersected by the parent at the head of the queue without determination of a strict view-dependent error bound.

3. A process according to claim 2, further including the step of force splitting a selected element includes:

identifying any neighboring elements that must be split before the selected element may be split;

force splitting those neighboring elements; and splitting the selected element and other elements that must be split with the selected element to maintain a continuity of elements.

4. A process according to claim 2, wherein determining whether each element in the initial representation intersects a line of sight includes:

defining a wedgie from the coordinates of element vertices and the strict view-dependent error metric for each element being tested;

making a first determination whether a line of sight vector intersects the wedgie of each element being tested; and making a second determination if the line of sight vector intersects both top and bottom planes of wedgie if the first determination is positive, where the second determination specifies that the line of sight intersects the terrain contained within the element at the level of resolution associated with the element and at all finer levels of detail.

5. A process according to claim 1, further including the step of force splitting a selected element includes:

identifying any neighboring elements that must be split before the selected element may be split;

force splitting those neighboring elements; and splitting the selected element and other elements that must be split with the selected element to maintain a continuity of elements.

6. A process according to claim 1, further including:

selecting new view parameters with a concomitant new view volume;

making a determination whether a previous view space representation may be modified to form the new view space representation;

if the determination is positive, using the previous view space representation, including its split queue, merge queue, and tree, as a new initial representation;

updating the view volume test for the set of elements in the tree, including identifying leaf elements that are newly within the view volume;

placing the leaf elements that are newly within the view volume on the split queue;

updating the view-dependent error for the set of elements on the split and merge queues;

making a determination whether the number of elements or the maximum error bound on the split queue meets selected target values and whether the maximum error on the split queue is less than or equal to the minimum error on the merge queue; and improving the representation if the determination is negative.

7. A process according to claim 6, further including:

determining whether each element in the tree forming the new initial representation intersects a line of sight;

placing leaf elements in the new initial representation that intersect the line of sight at the head of the split queue without determination of a strict, view-dependent error bound;

during step (m) for each one of the children whose parent intersected a line of sight, determining whether each one of those children intersects the line of sight intersected by the parent; and placing the resulting children that intersect the line of sight at the head of the queue without a determination of a strict view-dependent error bound.

8. A process according to claim 7, wherein determining whether each element in the initial representation intersects a line of sight includes:

defining a wedgie from the coordinates of element vertices and the strict view-dependent error metric for each element being tested;

making a first determination whether a line of sight vector intersects the wedgie of each element being tested; and making a second determination if the line of sight vector intersects both top and bottom planes of wedgie if the first determination is positive, where the second determination specifies that the line of sight intersects the terrain contained within the element at the level of resolution associated with the element and at all finer levels of detail.

9. A process according to claim 6, wherein improving the representation includes:

identifying elements in the split queue with the largest error bound;

force splitting the identified elements;

identifying elements in the merge queue with the lowest error bound; and merging children of the identified elements in the merge queue and placing the merged elements in the split queue with error bounds associated with the merged elements.

10. A process according to claim 9, wherein the step of force splitting the identified elements includes:

identifying any neighboring elements that must be split before the identified element may be split;

force splitting those neighboring elements; and splitting the identified element and other elements that must be split with the identified element to maintain a continuity of elements.

11. A process according to claim 1, wherein the view volume test includes:

defining a wedgie from the coordinates of element vertices and the strict view-dependent error metric;

defining the view volume by a view plane, back plane, and four side planes, where each plane forms two halfspaces, one halfspace outside the view volume and one halfspace inside the view volume;

selecting elements whose parents are partially within the view volume for testing against the halfspaces;

comparing the wedgie of each selected element with those halfspaces where the parent is not all in the halfspace; and labeling the wedgie of each selected element as entirely within the view volume, entirely outside the view volume, or as partially within the view volume.

12. A process according to claim 1, further including:

making a determination whether if is unlikely that an element will need to be split or merged within a selected number of succeeding frames;

placing the element in a deferred block for updating after the selected number of succeeding frames if the determination is positive; and placing the element in an immediate list for processing if the determination is negative.

13. A process according to claim 12, further including;

updating the view-dependent error of all elements on the immediate list; and updating the view-dependent error of all elements on the deferred block corresponding to a current frame.

14. A process according to claim 1, wherein converting the error metric with the view parameters to a view-dependent error metric includes:

computing the camera space coordinates (a, b, c) of the world space error vector $(0, 0, e_T)$, computing for each vertex of the element the camera space coordinates (p, q, r) of each vertex;

computing N, the maximum value of $(ar-cp)^2+(br-cq)^2$ over the vertices;

computing D, the minimum value of $r^2-c^2$ over all of the vertices; and setting the screen space error bound to N/D.

* * * * *